US012753016B1

(12) United States Patent
Pasti et al.

(10) Patent No.: US 12,753,016 B1
(45) Date of Patent: Oct. 6, 2026

(54) WEAR MANAGEMENT SYSTEM FOR MONITORING CONVEYOR-BASED SYSTEMS

(71) Applicant: Amazon Technologies, Inc., Seattle, WA (US)

(72) Inventors: Francesco Pasti, Verona (IT); Ioseph Abatematteo, Rovigo (IT); Francesco Di Vietro, Padua (IT); Riccardo Costa, Caerano di San Marco (IT); Luca Viaro, San Bellino (IT)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 18/678,187

(22) Filed: May 30, 2024

(51) Int. Cl.

| | |
|---|---|
| ***B65G 43/02*** | (2006.01) |
| ***B07C 3/08*** | (2006.01) |
| ***G01N 21/95*** | (2006.01) |
| ***G06T 7/00*** | (2017.01) |
| ***G06T 7/62*** | (2017.01) |

(52) U.S. Cl.
CPC .............. *B65G 43/02* (2013.01); *B07C 3/082* (2013.01); *G01N 21/95* (2013.01); *G06T 7/0002* (2013.01); *G06T 7/62* (2017.01); *B65G 2203/0275* (2013.01); *B65G 2203/041* (2013.01); *G06T 2207/10148* (2013.01); *G06T 2207/20081* (2013.01)

(58) Field of Classification Search
CPC ............ B65G 43/02; B65G 2203/0275; B65G 2203/041; B07C 3/082; G01N 21/95; G06T 7/0002; G06T 7/62; G06T 2207/10148; G06T 2207/20081
See application file for complete search history.

(56) References Cited

U.S. PATENT DOCUMENTS

| | | | | |
|---|---|---|---|---|
| 11,338,998 | B1 * | 5/2022 | Keck | B65G 41/008 |
| 2004/0206606 | A1 * | 10/2004 | Hochhaus | G01B 11/105 198/502.1 |
| 2007/0064244 | A1 * | 3/2007 | Mian | G01B 11/25 356/601 |
| 2017/0283183 | A1 * | 10/2017 | Erceg | B65G 43/02 |
| 2021/0078619 | A1 * | 3/2021 | Morita | B61L 15/0027 |

* cited by examiner

*Primary Examiner* — Monica T Taba
(74) *Attorney, Agent, or Firm* — Eversheds Sutherland (US) LLP

(57) ABSTRACT

A wear management system that monitors equipment of a conveyor-based system for scheduling the equipment for replacement and/or maintenance. The equipment may include carriers that operate on the conveyor-based system, such as a cross-belt sorter, and which diverts (e.g., sorts) item(s) from one location to another. The cross-belt sorter may include the carriers that traverse along tracks to convey the item(s). The carriers may include one or more wheels that engage with the tracks and imaging devices of the wear management system may be used to image the one or more wheels to determine whether any of the wheels are in need of replacement or maintenance. Such monitoring may occur while the carriers are in operation to reduce a downtime of the carrier, or more generally the cross-belt sorter.

15 Claims, 12 Drawing Sheets

WEAR MANAGEMENT SYSTEM FOR MONITORING CONVEYOR-BASED SYSTEMS

BACKGROUND

Modern environments, such as warehouses, distribution centers, airports, and manufacturing facilities include equipment for processing items. For example, conveyors or cross-sorters may be used to divert item(s) into bins, stations, etc. for sortation, shipment, and/or distribution. To increase throughput, the equipment may operate continuously. However, from time to time, the equipment may require maintenance. Reducing a downtime of the equipment may lead to an increase in throughput and efficiencies.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
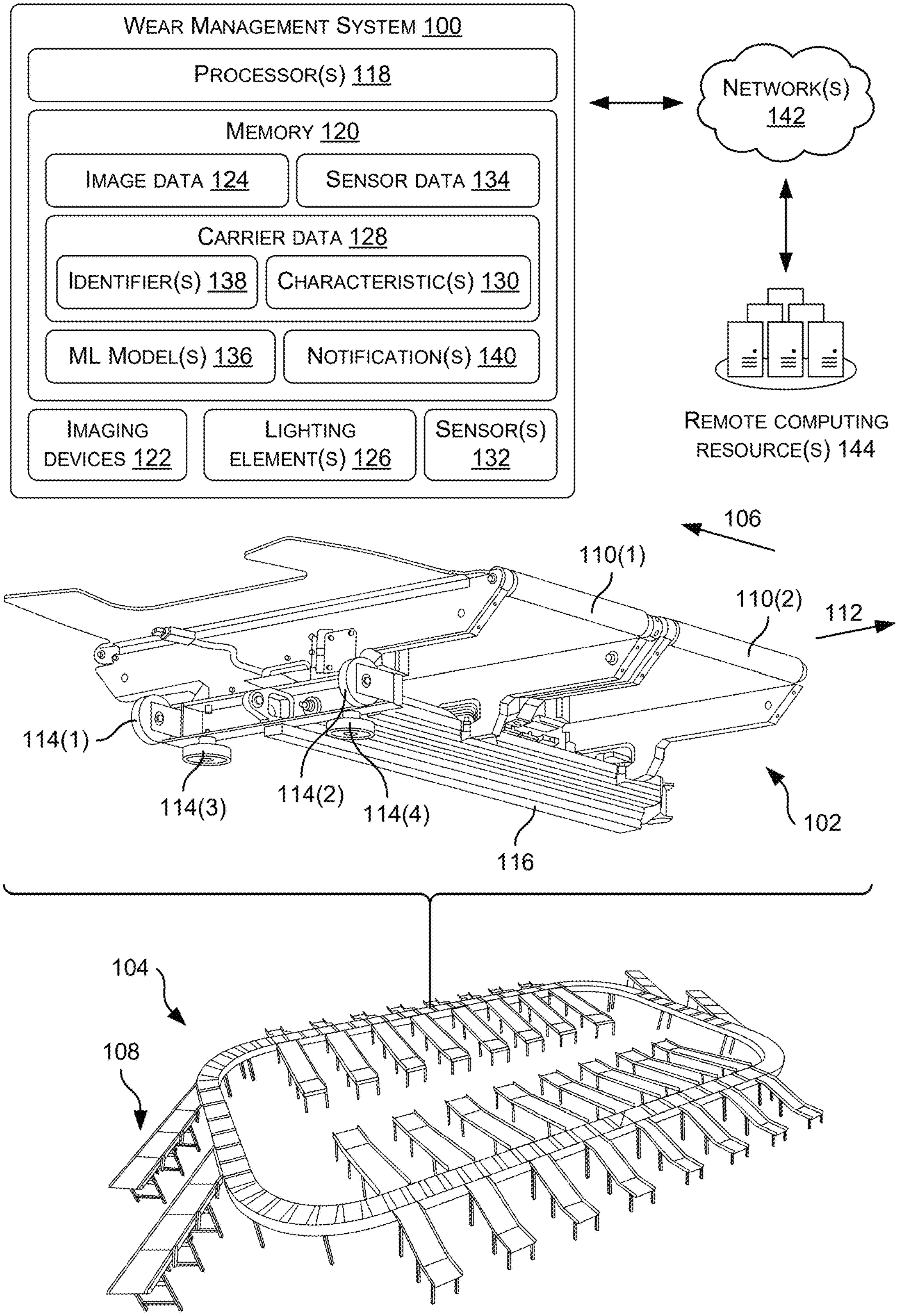
FIG. 1 illustrates an example environment including a cross-belt sorter and a wear management system for monitoring carriers of the cross-belt sorters, according to examples of the present disclosure.

This application is directed, at least in part, to a wear management system that monitors equipment of a conveyor-based system for scheduling the equipment for replacement and/or maintenance, according to examples of the present disclosure. In some instances, the equipment may include carriers that operate on the conveyor-based system, such as a cross-belt sorter, and which diverts (e.g., sorts) item(s) from one location to another. For example, the cross-belt sorter may be used to divert the item(s) into bins, or onto other equipment, for sortation, shipment, distribution, etc. The cross-belt sorter may include the carriers that traverse along tracks to convey the item(s) in a transportation direction. Additionally, the carriers may include one or more conveyors that discharge the item(s) into the bins or onto other equipment. In some instances, the one or more conveyors may discharge the item(s) at an orthogonal direction relative to the transportation direction. The carriers may include one or more wheels that engage with the tracks and imaging devices of the wear management system may be used to image the one or more wheels to determine whether any of the wheels are in need of replacement or maintenance. Such monitoring may occur while the carriers are in operation to reduce a downtime of the carrier, or more generally the cross-belt sorter. In doing so, a throughput of item(s) within the environment may be increased and/or errors may be reduced.

The carrier may include any number of wheels mounted to a frame, axles, etc., where the wheels may engage with the tracks of the cross-belt sorter. The tracks may be disposed along any length, include curves, bends, etc. The tracks may represent any suitable structural member (e.g., bar, strut, rail, etc.). In some instances, the carrier may include four wheels that engage with the tracks. In some instances, the carrier may include two horizontally disposed wheels that engage with a side of the tracks, and two vertically disposed wheels that engage with a top of the tracks. The carrier may be propelled, powered, etc. for traversing along the conveyor and diverting the item(s) at desired locations.

The imaging devices (e.g., cameras) of the wear management system may be disposed along the tracks, or at predetermined location(s) (e.g., stations) along the cross-belt sorter. In some instances, the imaging devices image the wheels in real-time as the carriers traverse along the cross-belt sorter. In some instances, four imaging devices are used to image the four wheels, respectively. For example, a first imaging device may image a first wheel of the carrier, a second imaging device may image a second wheel of the carrier, a third imaging device may image a third wheel of the carrier, and a fourth imaging device may image a fourth wheel of the carrier. In some instances, the imaging devices are oriented orthogonally to a rotational axis of the wheels, respectively. Moreover, given the different orientation of the wheels, the imaging devices may be oriented appropriately. In some instances, arms, members, etc. may extend from the cross-belt sorter, or a frame thereof, and the imaging devices may be coupled thereto for orienting the imaging devices at the wheels, respectively.

Although the wear management system is described as including four imaging devices to image the four wheels, in some instances, the imaging devices may image more than one of the wheels. For example, an imaging device may image two of the wheels. Additionally, the wear management system may include more than, or less than, four of the imaging devices. Still, the carrier may include more than or less than four wheels for being imaged by the imaging devices.

The wear management system may include lighting element(s) that illuminate the wheels for imaging by the imaging device(s). In some instances, the lighting element(s) may include ring-lighting elements that are disposed at least partially around the imaging devices, respectively. In some instances, the lighting elements may emit infrared (IR) light (e.g., 890 nm) that is detectable by the imaging devices. In some instances, a filter is installed on the imaging devices such that the imaging devices capture reflected IR light to reduce, or eliminate, noise (e.g., artifacts) from other light sources within an environment of the cross-belt sorter. For example, the imaging devices may capture IR light reflected off the wheels.

The imaging devices may generate image data representative of the wheels and which is analyzed by the wear management system to determine whether the wheels are in need of replacement or maintenance. For example, as the wheels traverse along the tracks, the wheels may become worn. Analyzing the image data, such as using computer vision based solutions and/or computer vision algorithms, may be used to determine whether the wheels are in need of replacement. For example, a diameter of the wheel may be determined from the image data, and the diameter may be compared to or against a threshold. If the diameter is less than the threshold (e.g., 98 millimeters), the wheel may be worn and in need of replacement. Alternatively, if the diameter is greater than the threshold, the wheel may not be worn and not in need of replacement.

Each of the imaging devices may generate image data that is analyzed to determine whether any of the wheels of the carrier are in need of replacement. Moreover, more than one image of the wheels, respectively, may be analyzed to determine an average diameter. From the multiple images, or the multiple image data, diameters of the wheel may be determined. The diameters may be averaged, and the average diameter may then be compared to the threshold to determine whether the wheel is in need of replacement.

In some instances, the image data may be additionally or alternatively analyzed to determine defect(s) of the wheels and whether the wheels are in need of replacement or maintenance. For example, the wheels may become cracked, torn, chipped, etc. If the image data indicates such defect(s) in the wheel, the wheel may be replaced or maintained. The image data may also be analyzed to determine whether the wheels have shifted or are misaligned. For example, the wheels may mount about an axle disposed through a slot within a flange of the frame of the carrier. In some instances, the axles may become misaligned within the slot. Such misalignment may lead to increased wear on the wheel. If the axles become misaligned, for example, the carrier may be scheduled for maintenance.

Additionally, in some instances, the wear management system may include sensor(s) used to monitor the carrier. For example, thermal sensor(s) may generate sensor data indicative of temperatures associated with bearings of the wheels, respectively. If the temperatures are greater than a threshold temperature, the bearings and/or wheels may be scheduled for replacement and/or maintenance. As another example, microphone(s) of the wear management system may generate sensor data that is used to determine noise associated with the bearings (e.g., knocking, bumping, humming, etc.) and whether the bearings are in need of replacement or maintenance.

The sensor(s) of the wear management system may also include proximity sensors (e.g., laser proximity sensors) that detect a presence of the carrier and/or the wheels being adjacent to the imaging devices. For example, upon detecting a presence of the wheels, the imaging devices may be instructed to capture the image data of the wheels. The proximity sensors may also be used to cause the lighting element(s) to illuminate such that the lighting element(s) illuminate a field of view of the imaging devices. Additionally, sensor data generated by the proximity sensors may be used to determine a distance to the wheels. The distance may be used to ensure that the imaging devices generate image data of the wheels that is in focus. For example, the distance may be used to determine a focal length, focusing position, etc. of the imaging devices. In turn, the imaging devices (or components thereof, such as lenses), may be adjusted. In some instances, four of the proximity sensors may be used, where each of the proximity sensors may be associated with each of the imaging devices, respectively.

In some instances, the wear management system stores or has access to machine-learned (ML) model(s) that are used to analyze the image data and/or the sensor data. The ML model(s) may be trained from a database (e.g., historical data, such as image data and/or sensor data of previous wheels that were repaired, replaced, etc., and/or previous wheels that were not repaired, replaced, etc.) to analyze the image(s) captured by the imaging device for identifying the characteristic(s) of the wheels, such as size, cracks, chips, etc. The ML model(s), upon identifying one or more of these characteristic(s), may assess the size, cracks, chips, etc. in comparison with information stored in the database to determine whether the wheel needs to be replaced or maintained.

As part of the ML model(s) analyzing the image data and/or the sensor data, the ML model(s) may label characteristic(s) of the wheel that indicate whether the characteristic(s) is associated with a wheel that needs to be replaced or maintained. Therein, an output of the ML model(s) may indicate whether the wheel needs to be replaced or maintained. In some instances, the ML model(s) may determine the characteristics(s) for comparison to respective references for determining whether the wheel needs to be replaced or maintained. The ML model(s) may use any number of characteristic(s) for determining whether the wheel needs to be replaced or maintained. In some instances, the ML model(s) may generate scores that are associated with the wheel needing to be replaced or maintained.

In some instances, any number of ML model(s) may be used to analyze the image data and/or sensor data. For example, a first ML model may determine the size (e.g., diameter) of the wheel, a second ML model may determine whether any chips, cracks, etc. are present in the wheel, a third ML model may determine whether bearings need to be replaced, a fourth ML model may determine whether the wheel has become misaligned, is loose, and so forth. Each of the ML model(s) may be respectively trained from a database to identify respective characteristic(s) for determining whether the wheel needs to be replaced or maintained.

In some instances, the image data and/or the sensor data may be used to predict when wheels needs to be replaced or maintained. For example, the image data and/or the sensor data may be used to record a history of the wheels, and predictive techniques may be used to determine instances in time when wheels needs to be replaced or maintained. For example, tracking a history of the wheels may be used to determine the wear on the wheel over time, for example, to determine when the wheel needs to be replaced. In some instances, ML model(s) may be used to predict when the wheel needs to be replaced.

In some instances, the carriers may include one or more identifier(s) that are readable by the imaging device(s) and/or the sensor(s). The identifier(s) may be used to identify the carriers and/or wheels amongst one another. For example, any number of the carriers may be disposed along the cross-belt sorter and the identifier(s) may be used to distinguish the carriers and/or wheels from one another. As the image data and/or the sensor data is captured, the image data and/or the sensor data may be associated with a respective carrier and/or wheel. In turn, as the image data and/or the sensor data is analyzed, determinations of whether the wheels need to be replaced and/or repaired may be associated with the carriers and/or wheels. Example identifier(s) include barcodes, a series of numbers, QR code, image, icon, etc.

In some instances, each carrier and/or wheel may include an identifier. Alternatively, the carrier may include a single identifier and the image data generated across the imaging devices may be associated with respective wheels, knowing which imaging devices generated the image data, respectively. Moreover, in some instances, only a predetermined number of the carriers may include identifiers, and the identifier of one carrier may be used to determine a placement of a second carrier. For example, a first carrier may include an identifier, while a second carrier, following the first carrier may not include an identifier. The position of the second carrier, relative to the first carrier, may be known and/or stored in association. As the imaging devices generate the image data, the image data may be associated with the second carrier (or the wheels thereof) knowing the position of the second carrier relative to the first carrier. That is, image data generated after the image data of the wheels of the first carrier may be associated with the wheels of the second carrier.

In some instances, if the wheels are in need of replacement or maintenance, one or more notification(s) (e.g., alerts, warnings, etc.) may be output. For example, lighting element(s), speakers, etc. of the wear management system output notification(s). Additionally, or alternatively, the notification(s) may indicate the need to replace or maintain the wheels. Such notification(s) may be used to pull, retrieve, etc. the carrier from the cross-belt sorter. For example, the carrier may be removed or decommissioned from the cross-belt sorter to replace the wheels and/or perform other repairs.

The imaging devices and/or the sensors may be configured to generate the image data and the sensor data, respectively, in real-time as the carriers are traversing along the cross-belt sorter. Generating the image data and the sensor data in real-time may increase a throughput within the environment and reduce downtime. In some instances, however, the image data and the sensor data may not be captured in real-time, such as when the cross-belt sorter is idle, being repaired, etc. Additionally, analyzing the image data and/or sensor data may automate monitoring of the wheels and/or reduce error(s) conventionally experienced in manually assessing the wheels.

The wear management system includes suitable computing components (e.g., processor(s), memory, IPC, etc.) that analyzes the image data and/or sensor data, generates the notification(s), records a history of the carriers and/or wheels, etc. In some instances, the camera(s), the sensor(s), and/or lighting element(s) may be component(s) of the wear management system. Alternatively, the camera(s), the sensor(s), and/or the lighting element(s) may be computing components separate from wear management system, such as the cross-belt sorter, devices, etc. disposed within or external to an environment of the cross-belt sorter. In such instances, these devices may be in communication with the wear management system, the imaging devices, sensors, devices, etc. for analyzing the image data and/or sensor data, generating the notification(s), recording a history of the carriers and/or wheels, etc. In some instances, the wear management system may be in communication with remote computing resource(s), where the wear management system may transmit the image data and/or sensor data to the remote computing resource(s) for analysis.

Although the cross-belt sorter, or the wear management system, is described herein as monitoring the cross-belt sorter, the wear management system may find use within any type of environment in which item(s) are processed. Example environments include airports, distribution center, cross-docking environments, and so forth. The item(s) may represent any suitable item (e.g., electronics, accessories, clothing, etc.), such as packaged goods, unpackaged goods, luggage, and so forth. Additionally, although described herein as being used in conjunction with a cross-belt sorter, the systems and methods may be applicable to other wheel-based systems.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 Illustrates an example environment including a wear management system 100 that monitors carriers 102 disposed on a cross-belt sorter 104, according to examples of the present disclosure. In some instances, the cross-belt sorter 104 may be disposed within any suitable environment in which item(s), packages, etc. are processed (e.g., sorted, distributed, etc.). Generally, the cross-belt sorter 104 may have a transportation direction 106 that serpentines about the environment. One or more conveyors 108 may induct item(s) onto the cross-belt sorter 104 for processing.

The carriers 102, as will be explained herein, may engage with tracks (e.g., rails) of the cross-belt sorter 104 for moving in the transportation direction 106. In some instances, the carriers 102 may be self-powered and/or coupled to one or more belts, chains, etc. of the cross-belt sorter 104 for moving in the transportation direction 106. The carriers 102 themselves may also include one or more belts 110, for example, a first belt 110(1) and a second belt 110(2) that are individually actuatable to divert the item(s) to chutes, bins, etc. within the environment. The belts 110 may be bi-directional conveyor belts and receive the item(s). For example, item(s) may be deposited onto the first belt 110(1) and/or the second belt 110(2), and as the item(s) arrive at a predetermined location (e.g., chute), the first belt 110(1) and/or the second belt 110(2) may be actuated to divert the item, respectively. The item may be diverted in a diverting direction 112, which may be orthogonal to the transportation direction 106. Any number of the carriers 102 may be disposed along the cross-belt sorter 104, and the carriers 102 may, in some instances, be interconnected, coupled, etc. to one another (e.g., so as to form a continuous conveyor).

The carrier 102 may include wheels 114 that engage with the tracks of the cross-belt sorter 104. In some instances, the carrier 102 may include four of the wheels 114, such as a first wheel 114(1), a second wheel 114(2), a third wheel 114(3), and a fourth wheel 114(4). The first wheel 114(1) and the second wheel 114(2) may be vertically disposed or oriented wheels (e.g., rotate about the Z-axis), while the third wheel 114(3) and the fourth wheel 114(4) may be horizontally disposed or oriented wheels (e.g., rotate about the Y-axis). The wheels 114 may couple to a frame 116 of the carrier 102.

The wear management system 100 includes processor(s) 118 and memory 120, where the processor(s) 118 may perform various functions and operations associated with monitoring the carriers 102, and the memory 120 may store instructions executable by the processor(s) 118 to perform the operations described herein. For example, the wear management system 100 may include imaging devices 122 (e.g., camera(s)) that generate image data 124 associated with the wheels 114. In some instances, the imaging devices 122 image the wheels 114 in real-time as the carriers 102 traverse along the cross-belt sorter 104. In some instances, the wear management system 100 includes four of the imaging devices 122 for imaging the wheels 114, respectively. For example, a first imaging device may image the first wheel 114(1), a second imaging device may image the second wheel 114(2), a third imaging device may image the third wheel 114(3), and a fourth imaging device may image the fourth wheel 114(4).

The imaging devices 122 may generate the image data 124 associated with each of the wheels 114(1) (e.g., the first imaging device may generate image data 124 associated with the first wheel 114(1), the second imaging device may generate image data 124 associated with the second wheel 114(2), and so forth). The image data 124 is analyzed by the wear management system 100 to determine whether the wheels 114 are in need of replacement or maintenance. For example, as the wheels 114 traverse along and engage with the tracks, the wheels 114 may become worn. Analyzing the image data 124, such as using computer vision based solutions and/or computer vision algorithms, may be used to determine whether the wheels 114 are in need of replacement.

For example, it is envisioned that overtime, the weight of the item(s), the carrier 102, and the engagement with the tracks may cause wear on the wheels 114. In some instances, the wear may be associated with a diameter of the wheel 114 decreasing. The image data 124 may be analyzed to determine the diameter of the wheel 114, and the diameter may be compared to a threshold. If the diameter is less than the threshold, the wheel 114 may be worn and in need of replacement. Alternatively, if the diameter is greater than the threshold, the wheel 114 may not be worn and not in need of replacement. In some instances, the threshold may be based at least in part on characteristic(s) of the cross-belt sorter 104, the carrier 102, the wheel 114, etc.

In some instances, more than one image of the wheels 114, respectively, may be analyzed to determine an average diameter. For example, the imaging devices 122 may capture multiple images of the wheel 114. From the multiple images, or the multiple image data 124, diameters of the wheel 114 may be determined. The diameters may be averaged, and the average diameter may then be compared to the threshold to determine whether the wheel 114 is in need of replacement.

The wear management system 100 may include lighting element(s) 126 that illuminate the wheels 114 for imaging by the imaging devices 122. In some instances, the lighting element(s) 126 may include ring-lighting elements that are disposed around the imaging devices 122, respectively. In some instances, the lighting element(s) 126 may emit IR light that is detectable by the imaging devices 122. For example, a filter may be used such that the imaging devices 122 capture IR light reflected from the wheels 114 to generate the image data 124. The use of IR light may reduce, or eliminate, noise from other light sources within an environment of the cross-belt sorter 104.

The diameter of the wheel 114 may be stored within carrier data 128 of the memory 120. For example, characteristic(s) 130 of the wheel 114 may be determined from analyzing the image data 124, where the characteristic(s) 130 may indicate the diameter of the wheel 114. In addition, the characteristic(s) 130 may also include other defect(s) associated with the wheel 114. For example, the wheels 114 may become cracked, torn, chipped, etc. These other defect(s) may be determined from analyzing the image data 124 for use in determining whether the wheels 114 are in need of replacement or maintenance. For example, if the image data 124 indicates such defect(s) in the wheel 114, the wheel 114 may be replaced or maintained. The image data 124 may also be analyzed to determine whether the wheels 114 have shifted, become misaligned, or are loose. For example, as will be explained herein, the wheels 114 may mount about an axle disposed through a slot within a flange of the frame 116 of the carrier 102. In some instances, the axles may become misaligned within the slot, leading to potential wear, damage, etc.

The wear management system 100 may include sensor(s) 132 that generate sensor data 134. In addition to the imaging devices 122, the sensor(s) 132 may be used to monitor the carriers 102. For example, thermal sensor(s) may generate sensor data 134 indicative of temperatures associated with bearings of the wheels 114, respectively. If the temperatures are greater than a threshold temperature, the bearings and/or wheels 114 may be schedule for replacement or maintenance. As another example, the sensor(s) 132 may include microphone(s) that generate sensor data 134 associated with a noise of bearings (e.g., knocking, bumping, humming, etc.), and whether the bearings are in need of replacement or maintenance. Noise, heat, etc. associated with the carrier 102 may be stored as the characteristic(s) 130.

The sensor(s) 132 may also include proximity sensors (e.g., laser proximity sensors) that detect a presence of the carrier 102 and/or wheels 114 being adjacent to the imaging devices 122. For example, the sensor data 134 may indicate a presence of the wheels 114 adjacent to, approaching, etc. the imaging devices 122. In response, the imaging devices 122 may be instructed to capture the image data 124 of the wheels 114. Moreover, the proximity sensors may also be used to cause the lighting element(s) 126 to illuminate such that the lighting element(s) 126 illuminate a field of view of the imaging devices 122, respectively.

The sensor data 134 generated by the proximity sensors may also be used to determine a distance to, or position of, the wheels 114. The distance may be used to ensure that the imaging devices 122 generate image data 124 of the wheels 114 that is in focus. For example, the distance may be used to determine a focal length, focusing position, etc. of the imaging devices 122. In turn, the imaging devices 122 (or components thereof, such as lens(es)), may be adjusted. For example, based on the distance, zoom elements, focusing elements, etc. of the imaging devices 122 may be adjusted. In some instances, four of the proximity sensors may be used, where each of the proximity sensors may be associated with each of the imaging devices 122, respectively.

The imaging devices 122 and/or the sensor(s) 132 may be configured to generate the image data 124 and the sensor data 134, respectively, in real-time as the carriers 102 are traversing along the cross-belt sorter 104. For example, generating the image data 124 and/or the sensor data 134 in real-time may increase a throughout within the environment and reduce downtime of the cross-belt sorter 104. In some instances, however, the image data 124 and the sensor data 134 may not be captured in real-time, such as when the cross-belt sorter 104 is idle, being repaired, etc.

The wear management system 100 may utilize one or more machine-learned (ML) model(s) 136 for determining whether the wheels 114 need to be replaced or maintained. In some instances, the ML model(s) 136 may analyze the image data 124 and/or the sensor data 134 for use in determining whether the wheels 114 need to be replaced or maintained. In some instances, the ML model(s) 136 may determine or generate scores for the wheels 114. In some instances, the scores may be determined by accessing data associated with an individual wheel 114, such as the image data 124 and/or the sensor data 134, providing the image data 124 and/or the sensor data 134 as input to the ML model(s) 136, and generating, as output from the ML model(s) 136, the score that is associated with the individual wheels 114.

In some instances, the score may relate to a probability or likelihood that the wheel 114 needs to be replaced or maintained, or does not need to be replaced or maintained. In other words, the scores output by the ML model(s) 136 may be machine-learned scores. Machine learning generally involves processing a set of examples (called "training data") in order to train a machine learning model(s). A machine learning model(s), once trained, is a learned mechanism that can receive new data as input and estimate or predict a result as output. For example, a trained machine learning model may comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model may be trained to infer a probability, or a set of probabilities, for a classification task based on unknown data received as input.

In the context of the present disclosure, the unknown input may be the image data 124 and/or the sensor data 134 that is associated with a wheel 114, and the ML model(s) 136 may be tasked with outputting a score that indicates, or otherwise relates to, a probability of the wheel 114 needing to be replaced or maintained (or not needing to be replaced or maintained). For instance, the score may relate to a probability of a wheel 114 needing to be replaced (e.g. less than a threshold diameter).

The training data that is used to train ML model(s) 136 may include various types of data. In general, training data for machine learning may include two components, features and labels. However, in some instances, the training data used to train the ML model(s) 136 may be unlabeled. Accordingly, the ML model(s) 136 may be trainable using any suitable learning technique, such as supervised learning, unsupervised learning, semi-supervised learning, reinforcement learning, and so on. The features included in the training data may be represented by a set of features, such as in the form of an n-dimensional feature vector of quantifiable information about an attribute of the training data. The following is a list of example features that can be included in the training data for training the ML model(s) 136 described herein. However, it is to be appreciated that the following list of features is non-exhaustive, and features used in training may include additional features not described herein, and, in some cases, some, but not all, of the features listed herein. Example features included in the training data may include, without limitation, a diameter of the wheel 114, a shape of the wheel 114, a sidewall dimension of the wheel 114, a location of the wheel 114, an orientation and/or position of the wheel 114, cracks in the wheel 114, chips in the wheel 114, parts of the wheel 114 missing, a temperature associated with the wheel 114, a noise (e.g., sound) associated with the wheel 114, and so forth. In some instances, the features included within the training data may be associated with wheels 114 that are in need of replacement or maintenance, and/or wheels 114 that are not in need of replacement or maintenance.

In some instances, as part of the training process, weights may be applied to a set of features included in the training data, as derived from the historical data. In some instances, the weights that are set during the training process may apply to parameters that are internal to the ML model(s) 136 (e.g., weights for neurons in a hidden-layer of a neural network). These internal parameters of the ML model(s) 136 may or may not map one-to-one with individual input features of the set of features. The weights may indicate the influence that any given feature, parameter, or characteristic has on the score that is output by the ML model(s) 136.

The ML model(s) 136 may represent a single model or an ensemble of base-level machine learning models, and may be implemented as any type of machine learning model. For example, suitable machine learning models for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

In some instances, the ML model(s) 136 may identify or determine the characteristic(s) 130. The ML model(s) 136 may learn to identify complex relationships between the characteristic(s) 130 of the wheels 114. For example, the ML model(s) 136 may learn to associate certain characteristic(s)

130 with whether the wheels 114 needs to be replaced or maintained. In some instances, the ML model(s) 136 may associated certain characteristic(s) 130 with one another for use in determining whether the wheels 114 need to be replaced or maintained. The ML model(s) 136 herein allow for generating of the scores that more accurately predict whether the wheels 114 need to be replaced or maintained, leading to increased throughput throughout the environment.

In some instances, the ML model(s) 136 may learn to predict which of the wheels 114 need to be replaced or maintained by attributing corresponding scores to the individual wheels 114. In this manner, wheels 114 with low scores, for example, (e.g., below threshold) may not need to be replaced or maintained, while wheels 114 with high scores (e.g., above threshold) may need to be replaced or maintained. In some instances, the image data 124 and/or sensor data 134 may be used to predict when wheels 114 need to be replaced or maintained. For example, the image data 124 and/or sensor data 134 may be used to record a history of the wheels 114, such as within the carrier data 128, and predictive techniques may be used to determine instances in time when the wheel 114 needs to be replaced or maintained. For example, tracking a history of the wheels 114 may be used to determine the wear on the wheel 114 over time, for example, to determine when the wheel 114 needs to be replaced.

Although the use of a threshold is described as one example way of providing labeling (i.e., replaced or maintained), other techniques are contemplated, such as clustering algorithms, or other statistical approaches that use the trust scores may be used. The ML model(s) 136 is/are retrainable with new data in order to adapt the ML model(s) 136 to understand the wheels 114, as the characteristic(s) 130 of the wheels 114 change, or as new correlations become available. In some instances, the ML model(s) 136 may be retrained using the image data 124 and/or the sensor data 134.

In some instances, the carriers 102 may include one or more identifier(s) 138 that are readable by the imaging devices 122 and/or the sensor(s) 132. The identifier(s) 138 may be used to identify the carriers 102 and/or wheels 114 amongst one another. For example, as any number of the carriers 102 may be disposed along the cross-belt sorter 104, the identifier(s) 138 may be used to distinguish the carriers 102 and/or wheels 114 from one another. In some instances, as the image data 124 and/or the sensor data 134 is captured, the image data 124 and/or the sensor data 134 may be associated with a respective carrier 102 and/or wheel 114. As the image data 124 and/or the sensor data 134 is analyzed, determinations as to whether the wheels 114 need to be replaced or maintained may be associated with the carriers 102 and/or wheels 114. Example identifier(s) 138 include barcodes, a series of numbers, QR code, image, icon, etc.

In some instances, each of the carrier 102 and/or wheel 114 may include an identifier 138, where the identifier identifies the carrier 102 and/or the wheel 114, respectively. Alternatively, the carrier 102 may include a single identifier and the image data 124 generated across the imaging devices 122 may be associated with respective wheels 114 knowing which imaging devices 122 generated the image data 124, respectively. Moreover, in some instances, only a predetermined number of the carriers 102 may include identifiers 138, and the identifier 138 of one carrier may be used to determine a placement of a second carrier (or wheels) relative to the first carrier. For example, a first carrier may include an identifier 138, while a second carrier, following the first carrier may not include an identifier 138. The position of the second carrier, relative to the first carrier, may be known and/or stored in association. As the imaging devices 122 generate the image data 124, the image data 124 may be associated with the second carrier 102 knowing the position of the second carrier relative to the first carrier.

The wear management system 100 may generate notification(s) 140 associated with the wheels 114 needing to be replaced or maintained. In some instances, the notification(s) 140 may be output via lighting element(s), speaker(s), displays, etc. of the wear management system 100. In some instances, the notification(s) 140 may be generated and stored in association with the carriers 102 and/or the wheels 114, where the notification(s) 140 indicate the need to replace or maintain the wheels 114. Such notification(s) may be used to decommission the carrier 102 from the cross-belt sorter 104.

In some instances, the wear management system 100 is in communicatively, via one or more network(s) 142, with remote computing resource(s) 144. The wear management system 100, the remote computing resource(s) 144, and/or other devices may include network interface(s) (e.g., Bluetooth, Wi-Fi, etc.) for communicating over one or more network(s) 142.

The wear management system 100 may send the image data 124 and/or the sensor data 134 to the remote computing resource(s) 144 for analysis. In turn, the remote computing resource(s) 144 may determine whether the wheels 114 are in need of replacement or maintenance. The remote computing resource(s) 144 may have access to the data stored in the memory 120, as well as additional data (e.g., training database). Although the wear management system 100 is shown including certain components that analyze the image data 124 and/or sensor data 134, the wear management system 100 may include additional or alternative components. Moreover, the imaging devices 122, the sensor(s) 132, and/or the lighting element(s) 126 may be components separate from the wear management system 100, such as the cross-belt sorter 104, devices, etc. disposed within or external to an environment of the cross-belt sorter 104. In such instances, these devices may be in communication with the wear management system 100, the remote computing resource(s) 144, and so forth.

As used herein, a processor, such as the processor(s) 118 may include multiple processors and/or a processor having multiple cores. Further, the processor(s) 118 may comprise one or more cores of different types. For example, the processor(s) 118 may include application processor units, graphic processing units, and so forth. In one implementation, the processor(s) 118 may comprise a microcontroller and/or a microprocessor. The processor(s) 118 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 118 may possess its own local memory, which also may store program components, program data, and/or one or more operating systems.

Memory, such as the memory 120 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 118. The memory 120 is an example of non-transitory computer-readable media. The memory 120 may store an operating system and one or more software applications, instructions, programs, and/or data to implement the methods described herein and the functions attributed to the various systems.

The remote computing resource(s) 144 may be implemented as one or more servers and may, in some instances, form a portion of a network-accessible computing platform implemented as a computing infrastructure of processors, storage, software, data access, etc. that is maintained and accessible via a network such as the Internet. The remote computing resource(s) 144 does not require end-user knowledge of the physical location and configuration of the system that delivers the services. Common expressions associated with the remote computing resource(s) 144 include "on-demand computing", "software as a service (SaaS)", "platform computing", "network-accessible platform", "cloud services", "data centers", etc. However, in some instances, the remote computing resource(s) 144 may be located within a same environment as the cross-belt sorter 104.

Figure 2:
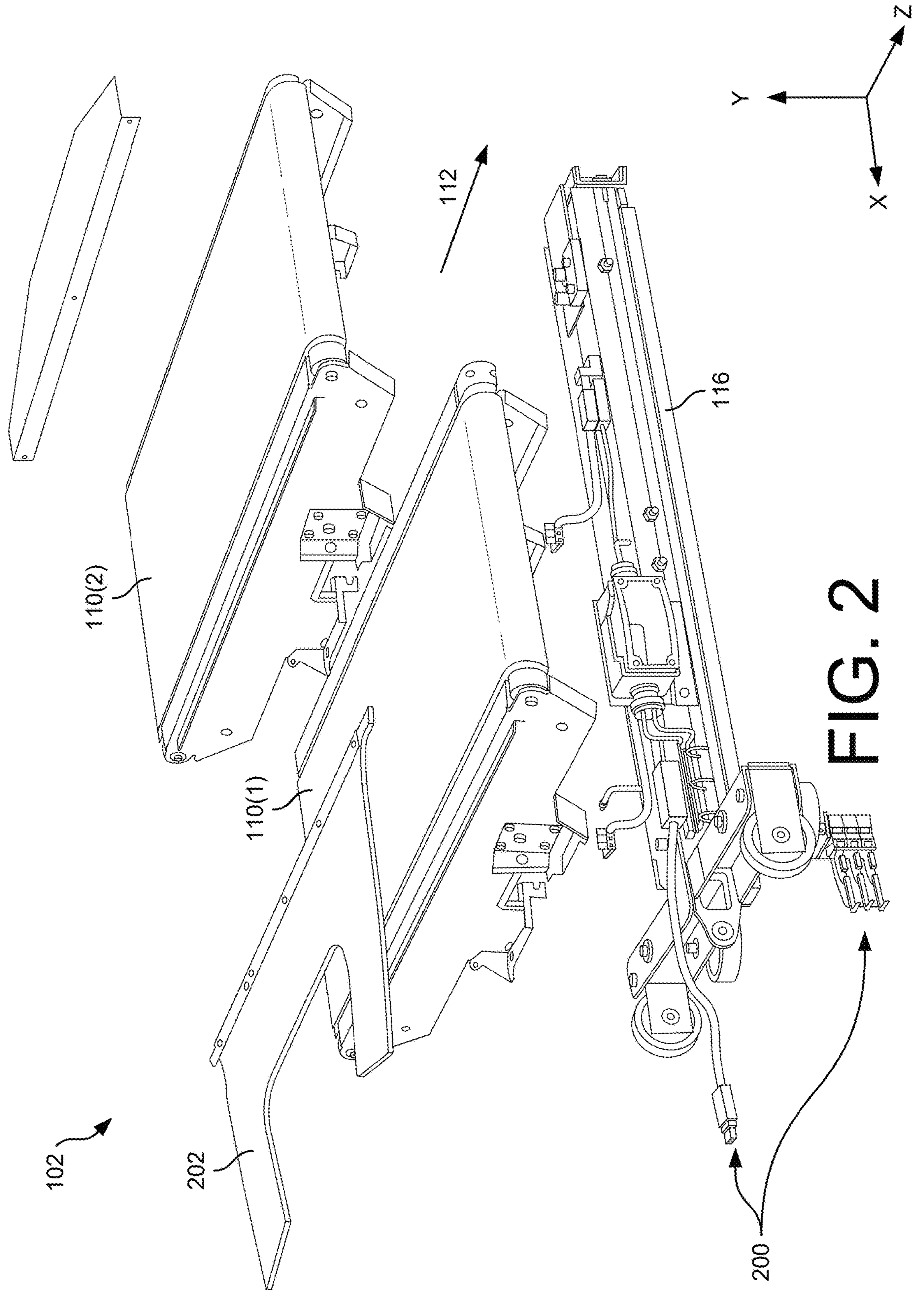
FIG. 2 illustrates a partially exploded view of the carrier of the cross-belt sorter of FIG. 1, according to examples of the present disclosure.

FIG. 2 illustrates an exploded view of the carrier 102, according to examples of the present disclosure. As introduced above, the carrier 102 includes the first belt 110(1) and the second belt 110(2), which may be mounted or coupled to the frame 116. One or more motor(s) may be mounted along the frame 116 for actuating the first belt 110(1) and the second belt 110(2) in the diverting direction 112. Although described as including two of the belts 110, the carrier 102 may include more than or less two of the belts 110. In some instances, the carriers 102 may be disposed end-to-end along the cross-belt sorter 104, and may be communicatively coupled together via one or more cables 200. For example, the cables 200 may transfer information, power, etc. between the carriers 102.

In some instances, one or more shrouds 202 may be disposed between adjacent carriers 102, for example, to prevent the item(s) falling of the cross-belt sorter 104. In some instances, the carriers 102 may include or more motor(s) for driving the carrier 102 along the cross-belt sorter 104. Alternatively, components (e.g., motors, hooks, etc.) may couple to the carrier 102 for driving the carrier 102 along the cross-belt sorter 104.

Figure 3:
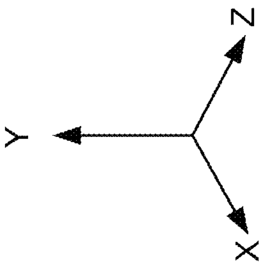
FIG. 3 illustrates a partial view of the carrier engaged with example tracks of the cross-belt sorter of FIG. 1, according to examples of the present disclosure.
Figure 3:
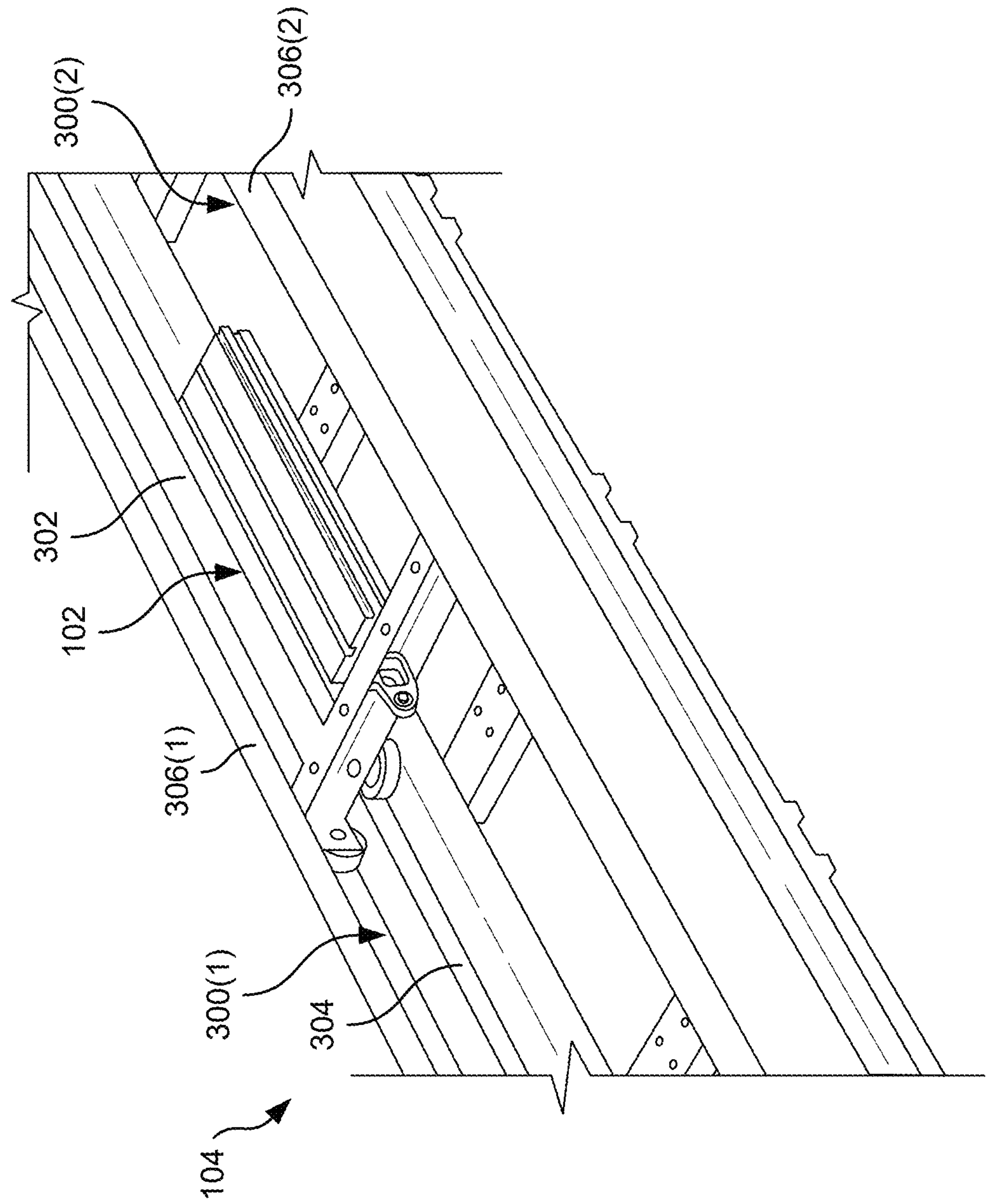

FIG. 3 illustrates an example engagement between the carrier 102 and the cross-belt sorter 104, according to examples of the present disclosure. As introduced above, the carrier 102 may engage with one or more tracks 300 of the cross-belt sorter 104. For example, the first wheel 114(1) and the third wheel 114(3) may engage with a first track 300(1) of the cross-belt sorter 104. The second wheel 114(2) and the fourth wheel 114(4), which are occluded in FIG. 3, may engage with a second track 300(2) of the cross-belt sorter 104. The first track 300(1) and/or the second track 300(2) may represent any suitable bar, member, strut, rail, etc. In some instances, the first wheel 114(1) may rest on a top 302 of the first track 300(1), while the third wheel 114(3) may engage with a side 304 of the first track 300(1).

The cross-belt sorter 104 may include additional members (e.g., bars, linkages, etc.) that couple the first track 300(1) and the second track 300(2) together. In some instances, the carrier 102 is retained within the cross-belt sorter 104 to prevent disengagement between the wheels 114 and the first track 300(1) and the second track 300(2). For example, a first flange 306(1) and a second flange 306(2) may prevent disengagement between the carrier 102 and the tracks 300 (e.g., in the Y-direction).

Figure 4A:
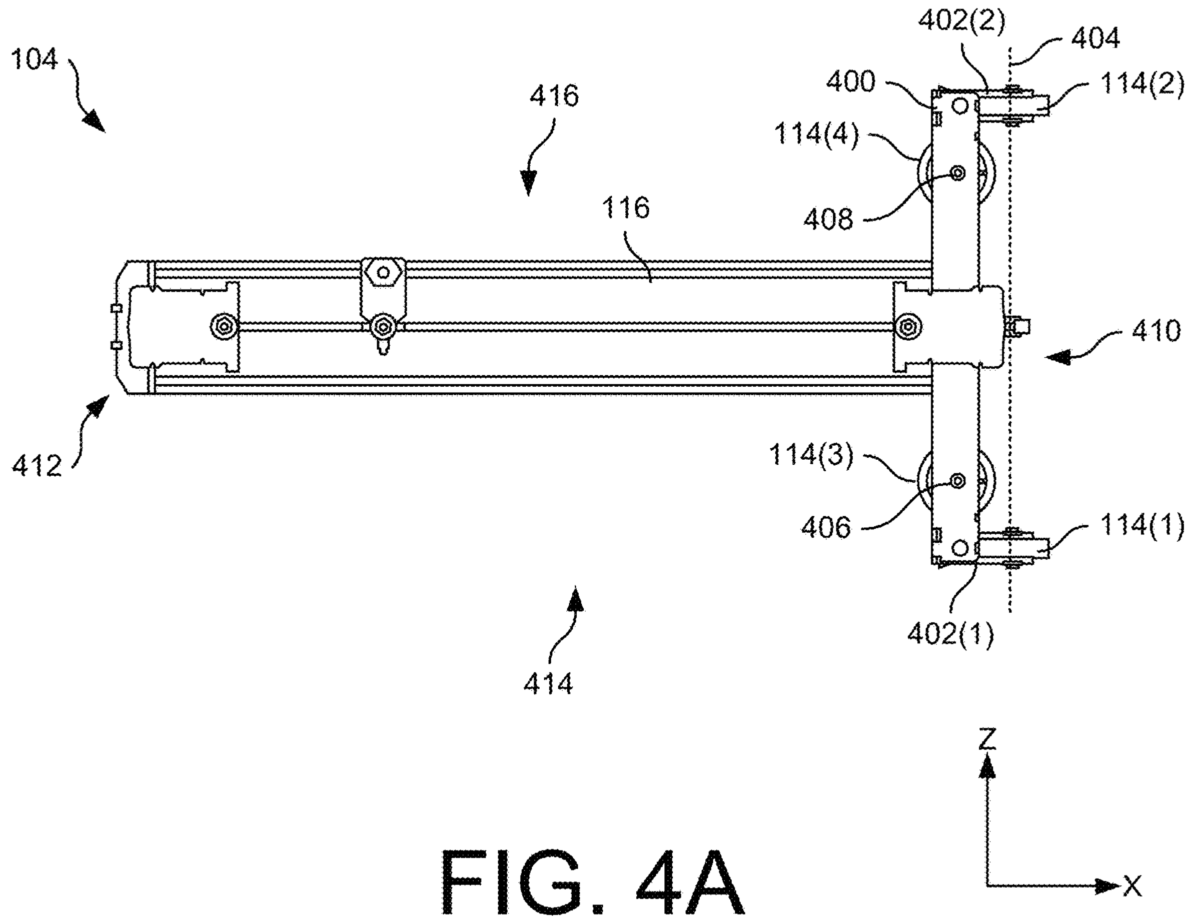
FIG. 4A illustrates a first view of the carrier of FIG. 1, showing examples wheels that engage with tracks of the cross-belt sorter of FIG. 1, according to examples of the present disclosure.
Figure 4B:
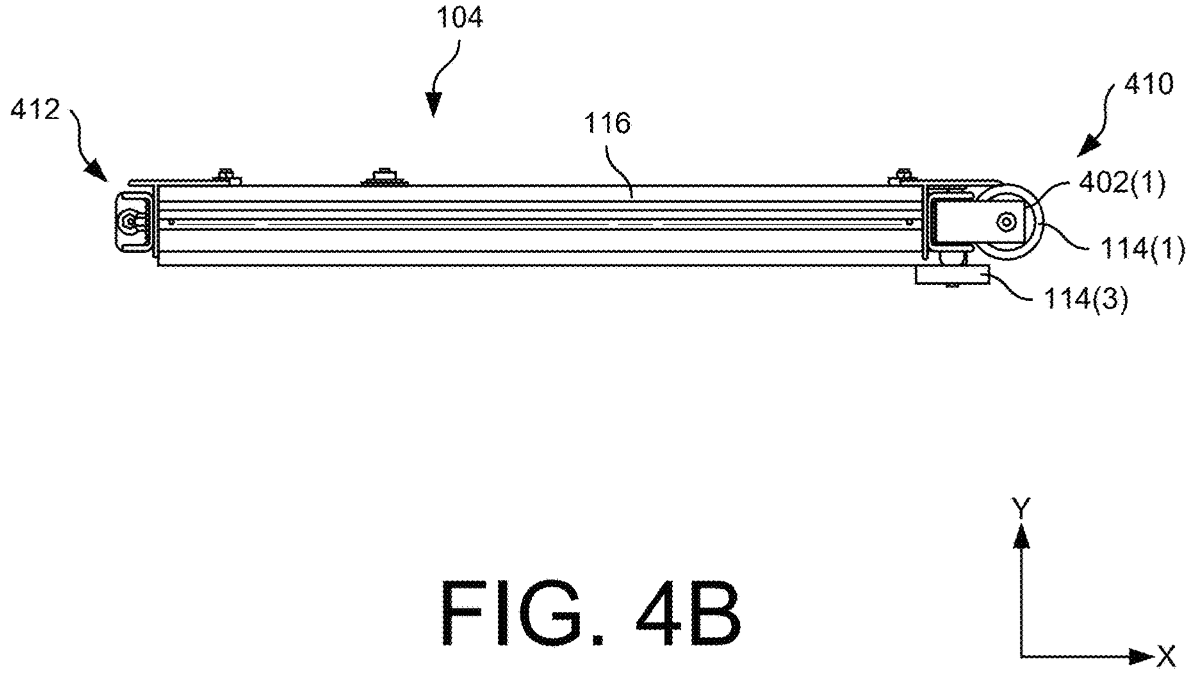
FIG. 4B illustrates a second view of the carrier of FIG. 1, showing examples wheels that engage with tracks of the cross-belt sorter of FIG. 1, according to examples of the present disclosure.

FIGS. 4A and 4B illustrate views of the carrier 102 with the wheels 114, according to examples of the present disclosure. FIG. 4A illustrates a top view of the carrier 102, while FIG. 4B illustrates a side view of the carrier 102. As introduced above, the carrier 102 may include the frame 116, a strut 400, and one or more flanges 402 to which the wheels 114 mount. The strut 400 may couple to the frame 116, and may be oriented orthogonally to the frame 116. The flanges 402 may include a first flange 402(1) and a second flange 402(2). The first wheel 114(1) may mount to the first flange 402(1), the second wheel 114(2) may mount to the second flange 402(2). The third wheel 114(3) and the fourth wheel 114(4) may mount to the strut 400. The wheels 114 may mount to the flanges 402 and the strut 400, respectively, via axles and/or bearings.

The first wheel 114(1) and the second wheel 114(2) may have a first orientation. For example, the first wheel 114(1) and the second wheel 114(2) may rotate about a first rotational axis 404 (e.g., Z-axis). The third wheel 114(3) and the fourth wheel 114(4) may have a second orientation. For example, the third wheel 114(3) may rotate about a second rotational axis 406 (e.g., Y-axis) and the fourth wheel 114(4) may rotate about a third rotational axis 408 (e.g., Y-axis). The second rotational axis 406 and the third rotational axis 408 may be parallel to one another. The first rotational axis 404 may be orthogonal to the second rotational axis 406 and the third rotational axis 408.

The identifier(s) 138 may be disposed on the frame 116, the strut 400, and/or the flange(s) 402 for imaging via the imaging devices 122 and/or the sensor(s) 132. In some instances, the first wheel 114(1) and the second wheel 114(2) may support a weight of the carrier 102 on the first track 300(1) and the second track 300(2), respectively. The third wheel 114(3) and the fourth wheel 114(4) may laterally position the carrier 102 on the tracks 300 (e.g., in the Z-direction).

In some instances, the wheels 114 may be disposed at a first end 410 of the carrier 102, spaced apart from a second end 412 of the carrier 102 (e.g., in the X-direction). In some instances, the first wheel 114(1) and the third wheel 114(3) may be disposed along a first side 414 of the carrier 102, while the second wheel 114(2) and the fourth wheel 114(4) may be disposed along a second side 416 of the carrier 102 spaced apart from the first side 414 (e.g., in the Z-direction). The third wheel 114(3) may be disposed between the first wheel 114(1) and the frame 116, while the fourth wheel 114(4) may be disposed between the second wheel 114(2) and the frame 116.

Although the carrier 102 is shown including four of the wheels 114, the carrier 102 may include more than or less than four of the wheels 114. Additionally, the wheels 114 may include a different orientation than shown, and in such instances, bars, struts, etc. of the carrier 102 may be modified accordingly.

Figure 5A:
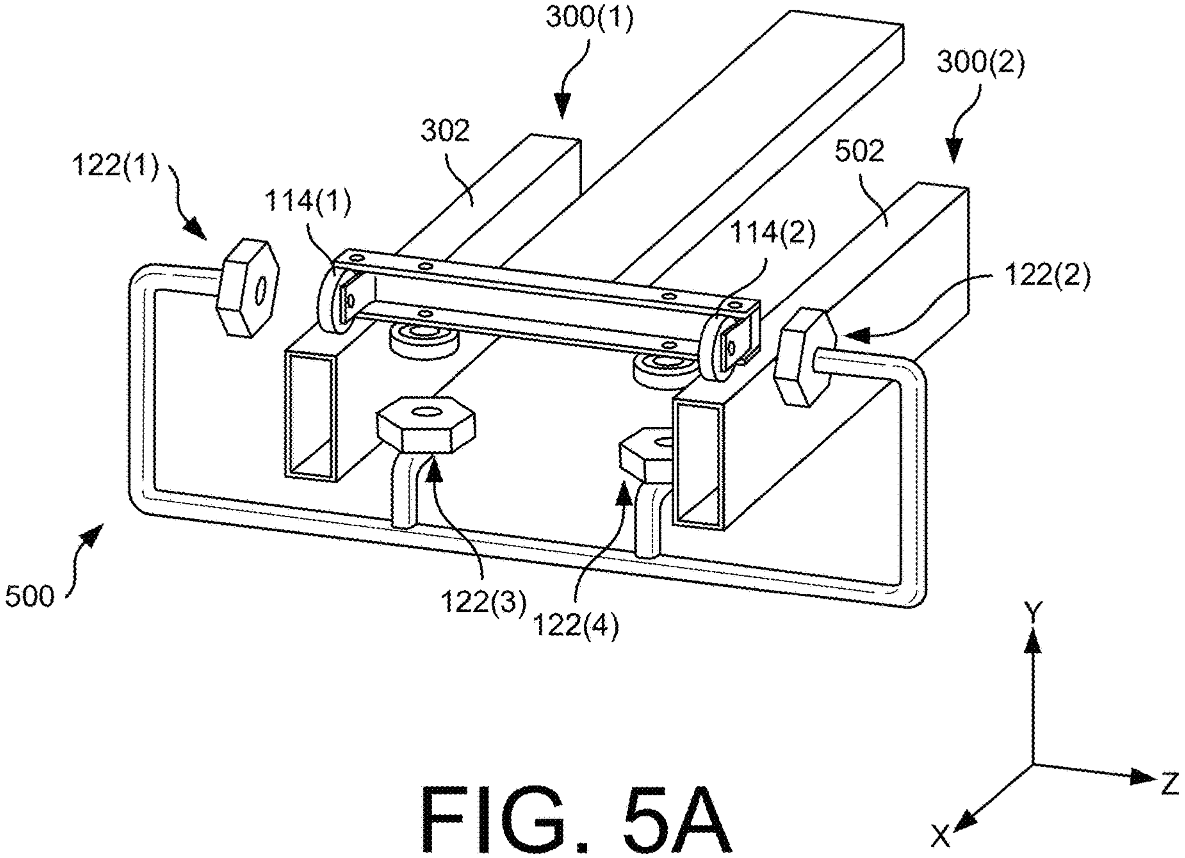
FIG. 5A illustrates a first view of example imaging device(s) arranged adjacent to the cross-belt sorter of FIG. 1 to image wheels of the carriers, according to examples of the present disclosure.
Figure 5B:
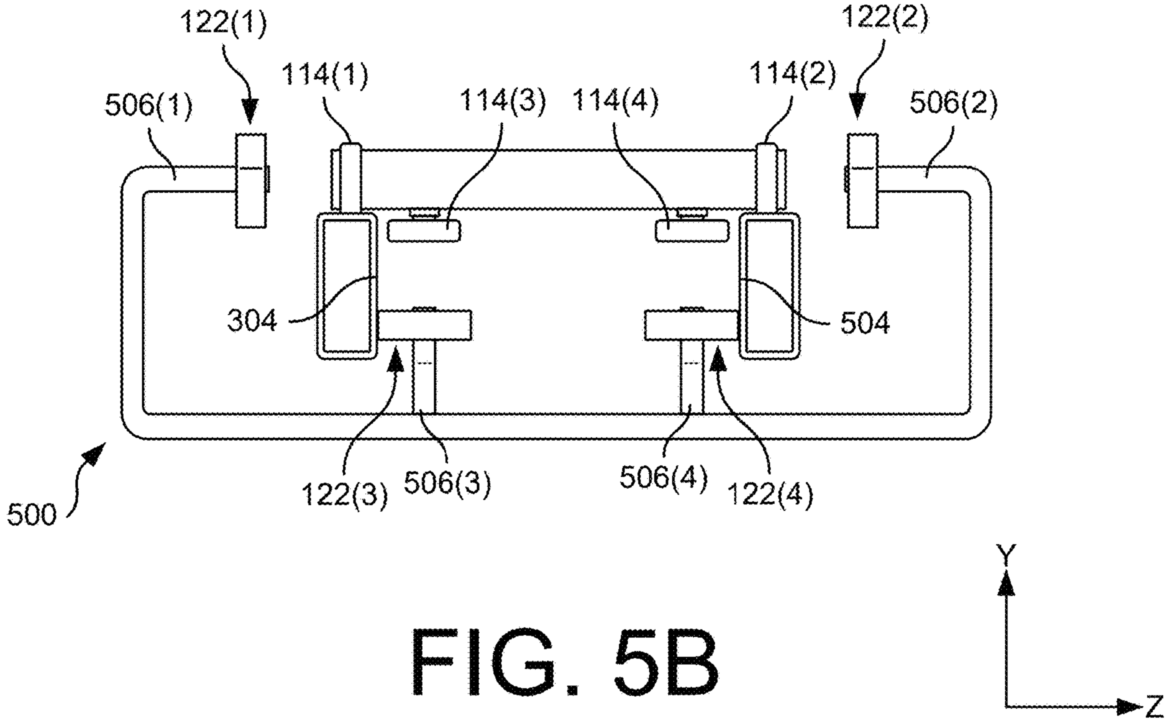
FIG. 5B illustrates a second view of example imaging device(s) arranged adjacent to the cross-belt sorter of FIG. 1 to image wheels of the carriers, according to examples of the present disclosure.

FIGS. 5A and 5B illustrate the wheels 114, the tracks 300, the imaging devices 122, and a structure 500 to which the imaging devices 122 are coupled, according to examples of the present disclosure. As introduced above, the first wheel 114(1) engages with the top 302 of the first track 300(1) and the third wheel 114(3) engages with the side 304 of the first track 300(1). The second wheel 114(2) engages with a top 502 of the second track 300(2) and the fourth wheel 114(4) engages with a side 504 of the second track 300(2).

The imaging devices 122 are arranged to image the wheels 114, respectively. For example, a first imaging device 122(1) may be arranged to image the first wheel 114(1), a second imaging device 122(2) may be arranged to image the second wheel 114(2), a third imaging device 122(3) may be arranged to image the third wheel 114(3), and a fourth imaging device 122(4) may be arranged to image the fourth wheel 114(4). In some instances, the first imaging device 122(1) and the second imaging device 122(2) may be arranged along the first rotational axis 404. The third imaging device 122(3) may be arranged along the second rotational axis 406, and/or the fourth imaging device 122(4) may be arranged along the third rotational axis 408. In some instances, an optical axis of the first imaging device 122(1) and/or an optical axis of the second imaging device 122(2) may be concentric with the first rotational axis 404. An optical axis of the third imaging device 122(3) may be concentric with the second rotational axis 406, and/or an optical axis of the fourth imaging device 122(4) may be concentric with the third rotational axis. Although not shown, each of the imaging devices 122 may be illuminated by a lighting element 126.

In some instances, the first imaging device 122(1) has a first field of view (FoV) that includes the first wheel 114(1), and/or may be oriented in a first direction. The second imaging device 122(2) has a second FoV that includes the second wheel 114(2), and/or may be oriented in a second direction that is opposite the first direction. The third imaging device 122(3) has a third FoV that includes the third wheel 114(3), and/or may be oriented in a third direction. The fourth imaging device 122(4) has a fourth FoV that includes the fourth wheel 114(4), and/or may be oriented in the third direction. The imaging devices 122 may be oriented orthogonally to the rotational axes of the wheels 114, respectively.

In some instances, the imaging devices 122 are disposed on arms 506 of the structure 500, where the arms 506 may orient the imaging devices 122. For example, the first imaging device 122(1) may be disposed on a first arm 506(1), the second imaging device 122(2) may be disposed on a second arm 506(2), the third imaging device 122(3) may be dispose don a third arm 506(3), and the fourth imaging device 122(4) may be disposed on a fourth arm 506(4). The arms 506 may be coupled together, and in some instances, wires, cables, etc. that provide power to the imaging devices 122, send the image data 124, etc. may be transmitted via the wires. The structure 500 may couple to the cross-belt sorter 104, and/or frames, brackets, etc. thereof. In some instances, openings, channels, etc. of the cross-belt sorter 104 may accommodate the imaging devices 122 for imaging the wheels 114, respectively.

In some instances, the sensor(s) 132 may be disposed on the structure 500, within the cross-belt sorter 104, along the tracks 300, etc. In some instances, the structure 500 may be disposed at predetermined location(s) (e.g., stations) along the cross-belt sorter 104. Along a length of the cross-belt sorter 104, any number of the imaging devices 122 may be included.

Figure 6:
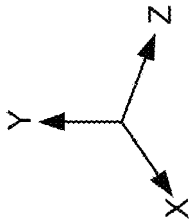
FIG. 6 illustrates a partially exploded view of an assembly containing an imaging device configured to be arranged adjacent to the cross-belt sorter of FIG. 1 to image wheels of the carriers, according to examples of the present disclosure.
Figure 6:
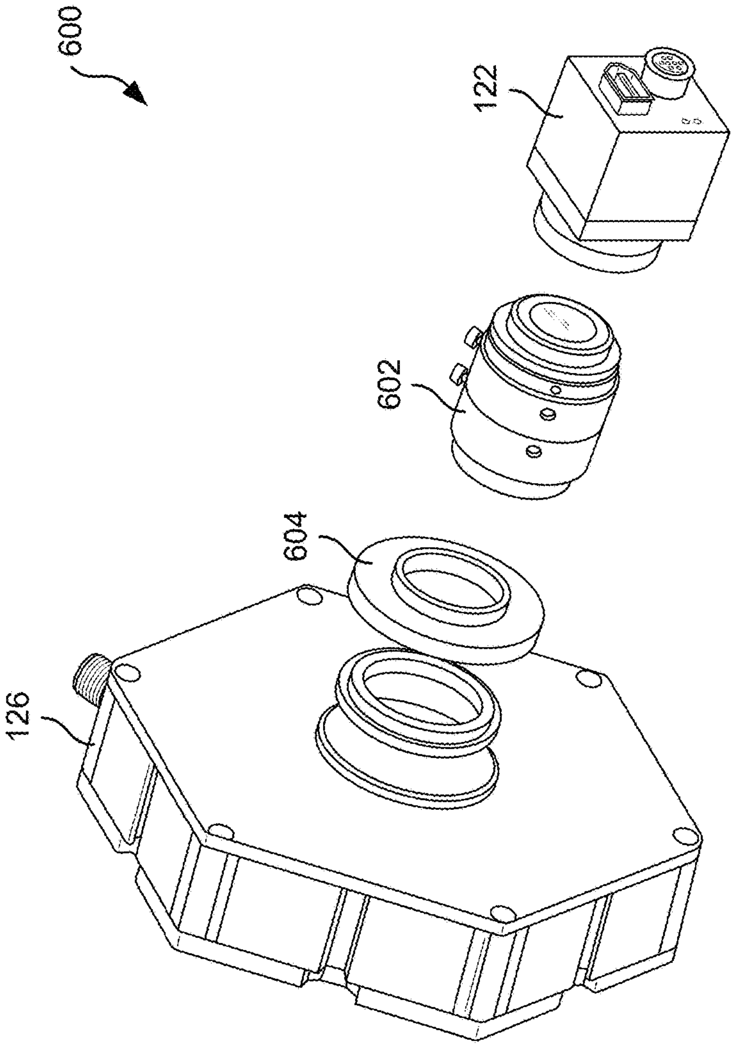

FIG. 6 illustrates an example assembly 600 including the lighting element 126, the imaging device 122, a lens 602, and/or a filter 604, according to examples of the present disclosure. In some instances, the assembly 600 may couple to the arms 506 of the structure 500, for imaging the wheels 114, respectively. The lighting element 126 may represent a ring-lighting element that emits IR light in a direction towards the wheel 114. The imaging device 122 may receive IR light reflected from the wheel 114, for example, to generate image data 124 associated with the wheel 114. The filter 604, for example, may filter permit only IR light to pass through onto the imaging device 122. Moreover, the lens 602 may be adjusted based on a distance between the imaging device 122 and the wheel 114.

Figure 7A:
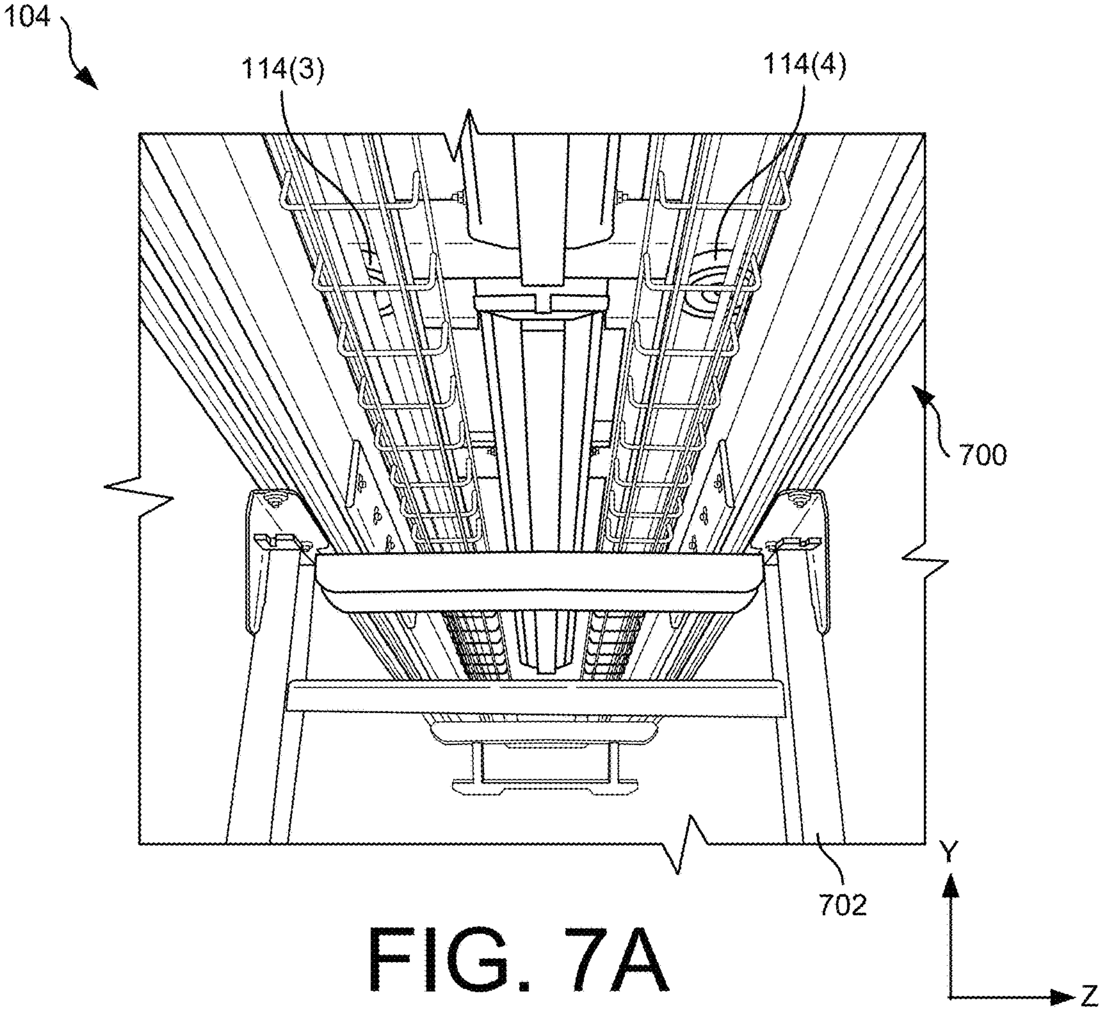
FIGS. 7A-7D illustrate views showing an example engagement between wheels of the carrier and tracks of the cross-belt sorter of FIG. 1, according to examples of the present disclosure.
Figure 7B:
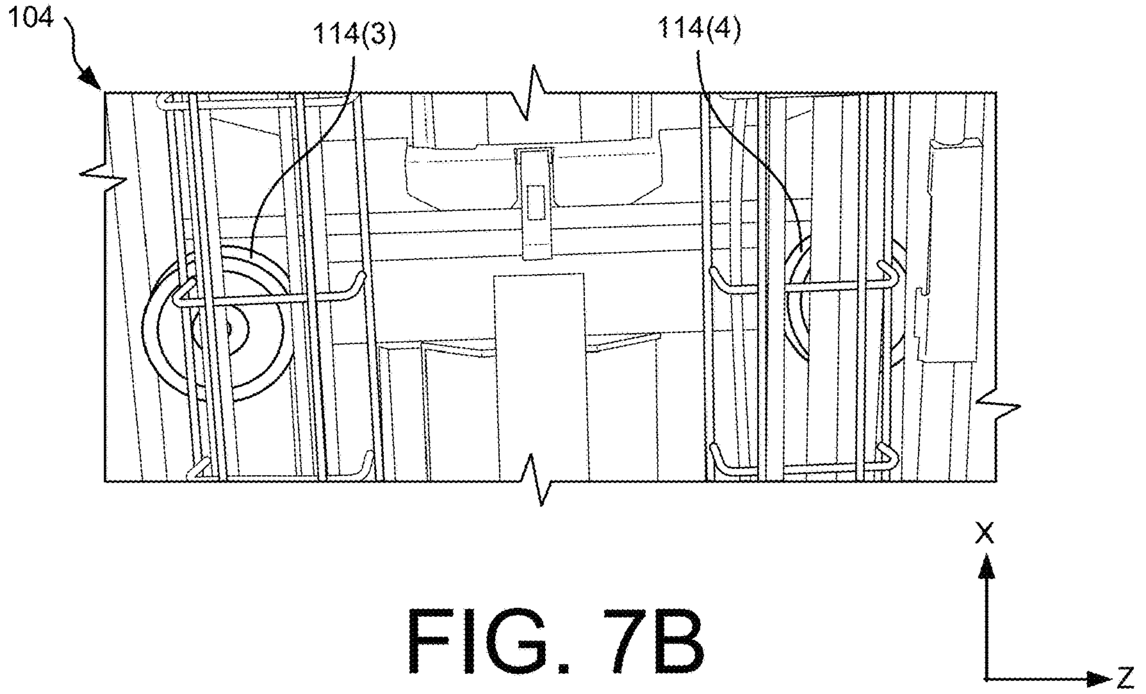
Figure 7C:
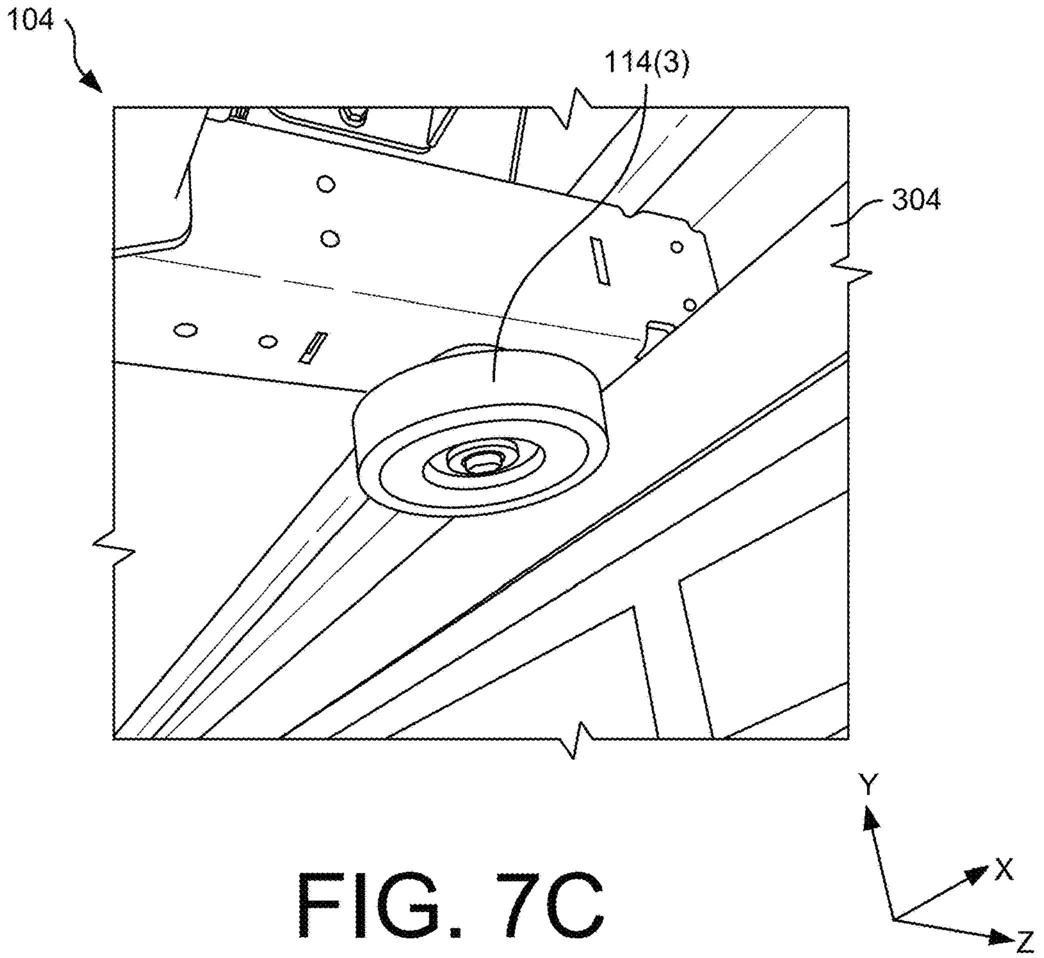
Figure 7D:
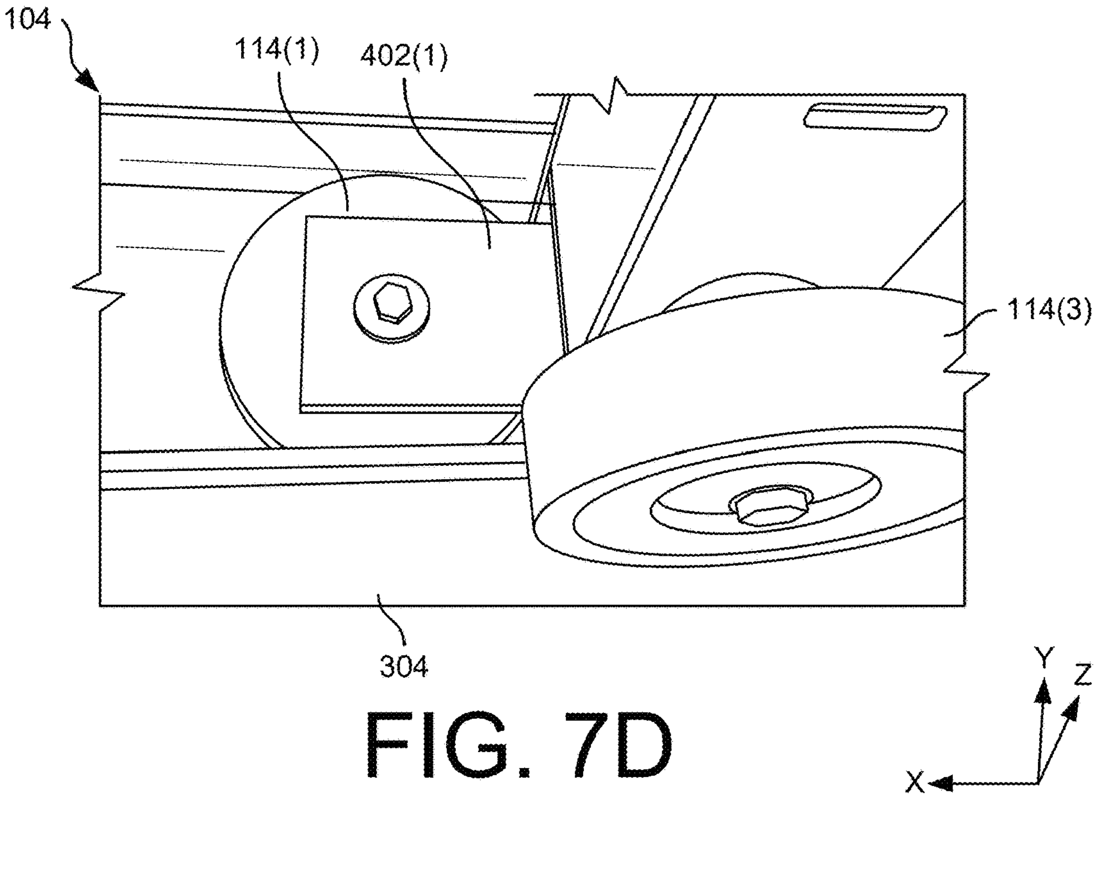

FIGS. 7A-7D illustrate various views showing the wheels 114 of the carrier 102 engaged with the tracks 300 of the cross-belt sorter 104, according to examples of the present disclosure. FIGS. 7A and 7B illustrate underneath sides of the cross-belt sorter 104, where wires, cables, fiber optics, etc. may run (e.g., for communication, power, etc.). In some instances, the structure 500, including the imaging devices 122, and/or the sensor(s) 132 may be disposed on the underneath side 700 of the cross-belt sorter 104. The structure 500, the imaging devices 122, the sensor(s) 132, the lighting elements 126 etc. may couple to a frame 702 of the cross-belt sorter 104. In some instances, the imaging devices 122, the sensor(s) 132, the lighting elements 126 may be disposed vertically above the wires.

Figure 8:
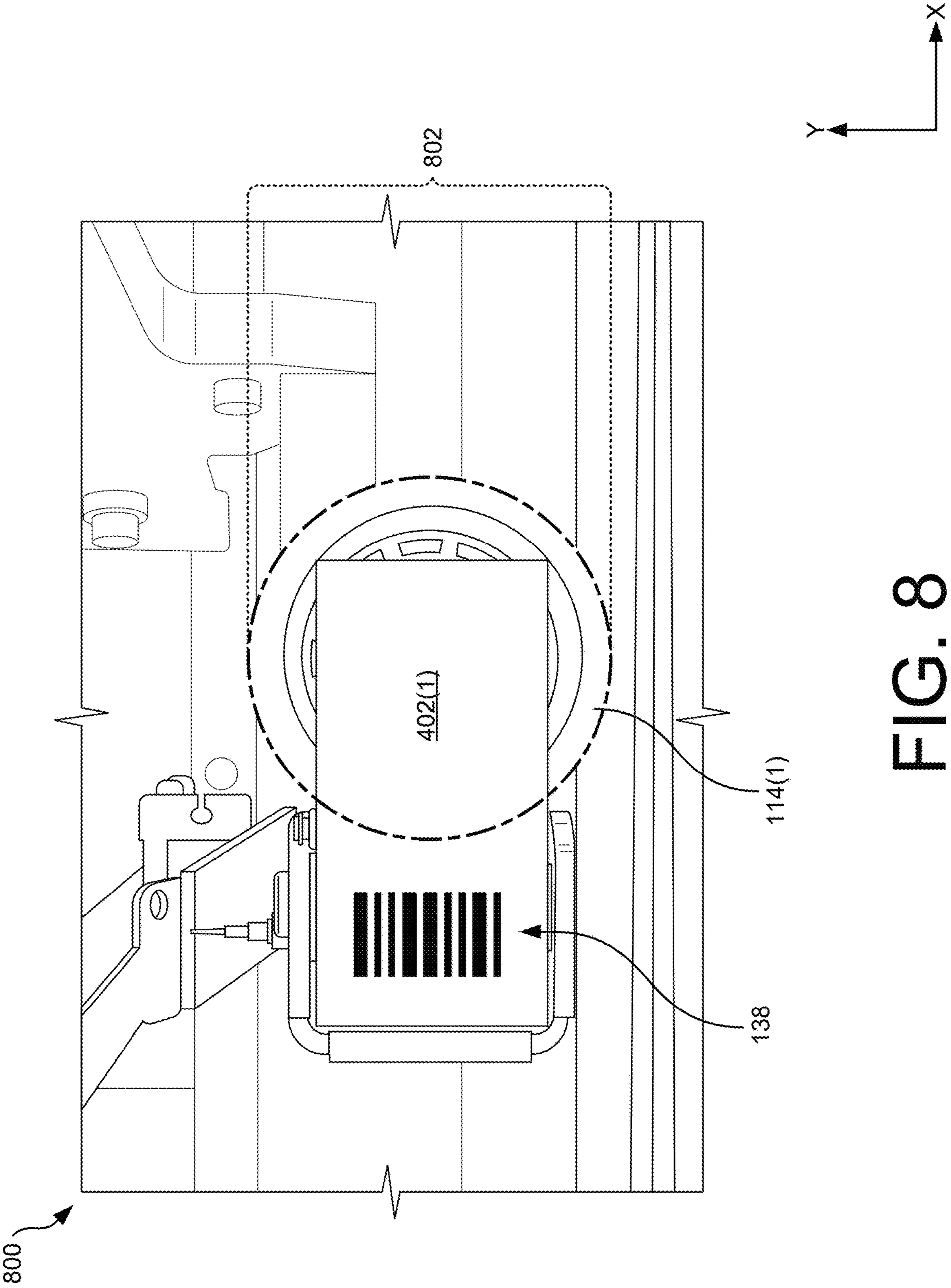
FIG. 8 illustrates an example image of a wheel of the carrier of the cross-belt sorter of FIG. 1, according to examples of the present disclosure.

FIG. 8 illustrates an example image 800, for example, that may be taken by the imaging device 122, according to examples of the present disclosure. In some instances, the image 800 may be taken by the first imaging device 122(1) imaging the first wheel 114(1). The image 800 is shown including the first wheel 114(1) and the first flange 402(1) to which the first wheel 114(1) couples. In some instances, the identifier 138 may be disposed on the first flange 402(1) for imaging by the imaging device 122.

The first wheel 114(1) may have a diameter 802. As introduced above, the image data 124 generated by the first imaging device 122(1) may be analyzed to determine the diameter 802, and the diameter 802 may be compared to a threshold for determining whether the first wheel 114(1) needs to be replaced or maintained. In some instances, the diameter 802 may be determine from several images, and therein an average diameter may be compared to the threshold for determine whether the first wheel 114(1) needs to be replaced or maintained. Moreover, although the discussion in FIG. 8 relates to the first wheel 114(1), the other imaging devices 122 may generate image data 124 associated with the other wheels for determining a diameter of the wheels 114, respectively.

Figure 9:
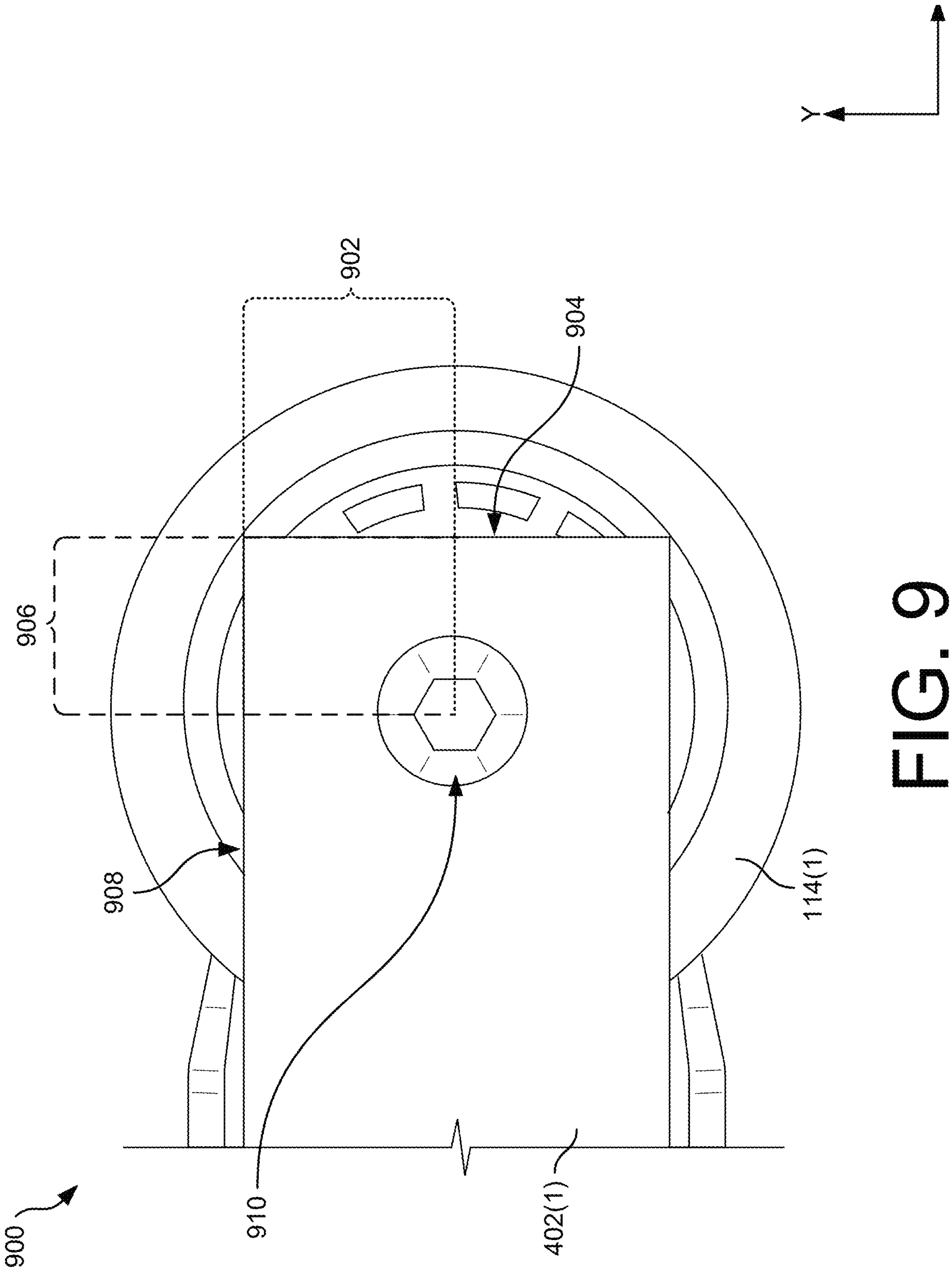
FIG. 9 illustrates an example image of a wheel of the carrier of the cross-belt sorter of FIG. 1, according to examples of the present disclosure.

FIG. 9 illustrates an example image 900, for example, that may be taken by the imaging device 122, according to examples of the present disclosure. In some instances, the image 900 may be taken by the first imaging device 122(1) imaging the first wheel 114(1), however, the discussion may apply to the other imaging devices 122 that image the other wheels.

The image 900 is shown including the first wheel 114(1) and the first flange 402(1) to which the first wheel 114(1)

couples, as well as a fastener 910 that couples the first wheel 114(1) to the first flange 402(1). In some instances, the first rotational axis 404 may be disposed through the fastener 910. In some instances, the image 900 may be analyzed to determine whether the fastener 910, or more generally the first wheel 114(1) has become loose, misaligned, etc. For example, a first distance 902 may be determined between a center of the fastener 910 and a first side 904 of the first flange 402(1), and/or a second distance 906 may be determined between the center of the fastener 910 and a second side 908 of the first flange 402(1). The first distance 902 and/or the second distance 906 may be compared to predetermined distances to determine whether the first distance 902 and/or the second distance 906 has remained the same (e.g., from past images) and/or is different (e.g., smaller or greater). If the first distance 902 and the second distance 906 are the same, the first wheel 114(1) may be adequately secured, tightened, etc. However, if the first distance 902 and/or the second distance 906 are different, the fastener 910 may be loose, thereby cause the fastener 910 to shift and the first distance 902 and/or the second distance 906 to be different from previous images. In such instances, the notification(s) 140 may be generated to perform maintenance on the first wheel 114(1) (e.g., tighten the fastener 910).

Although described as determining the first distance 902 and/or the second distance 906 for determining a misalignment of the first wheel 114(1), other reference points, datums, etc. may be used. Additionally, a determination may be made whether the first wheel 114(1) is centered (e.g., concentric) with the fastener 910 for determining whether the first wheel 114(1) is misaligned. Moreover, the fastener 910 may be disposed through a slot (e.g., channel, passage, etc.) in the first flange 402(1), and if the slot is visible within the image 900, this may be indicative of the first wheel 114(1) being misaligned.

Figure 10:
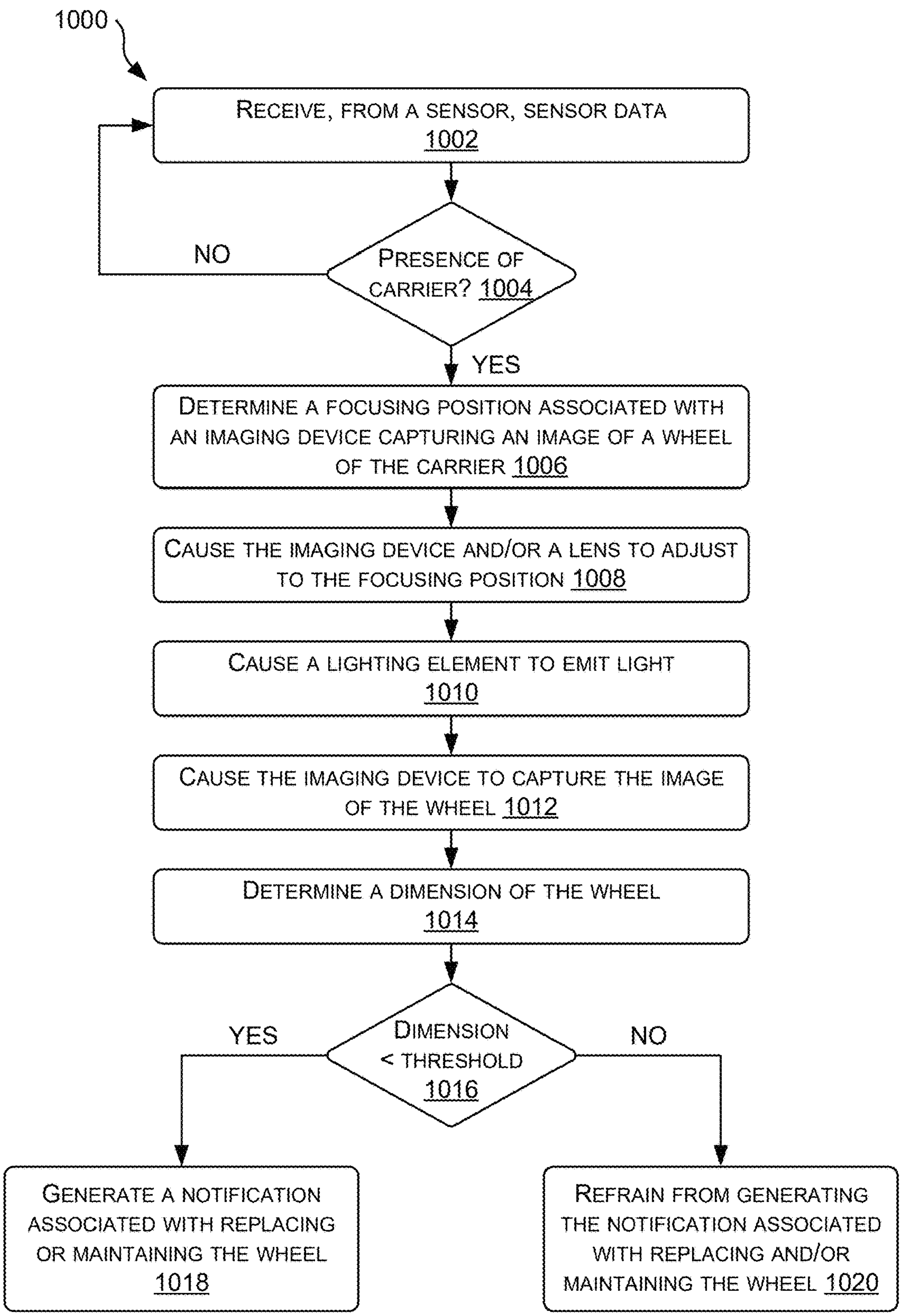
FIG. 10 illustrates an example process associated with determining a dimension of wheels of the carrier of the cross-belt sorter of FIG. 1 and whether the wheels are in need of replacement, according to examples of the present disclosure.
Figure 11:
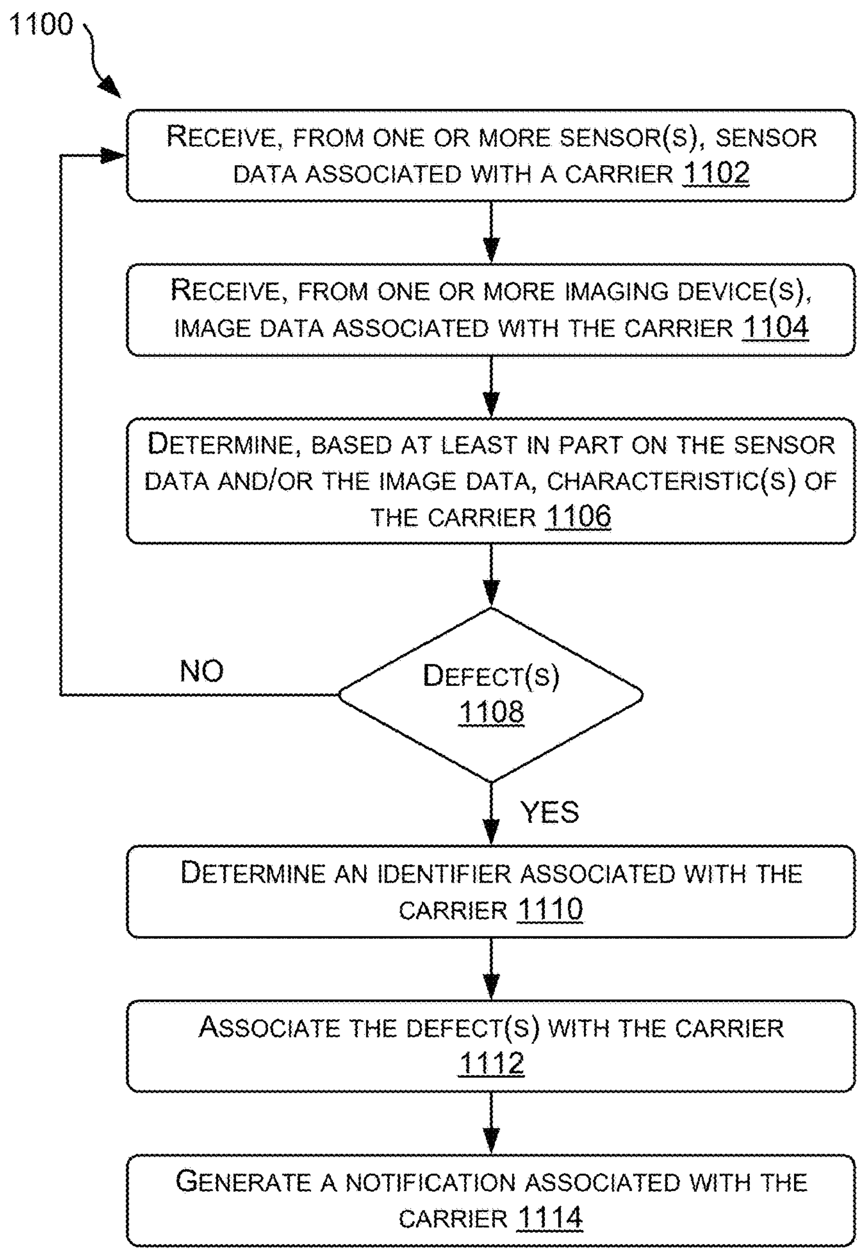
FIG. 11 illustrates an example process associated with determining defect(s) of the carrier of the cross-belt sorter of FIG. 1, according to examples of the present disclosure.

FIGS. 10 and 11 illustrate example process (e.g., method) related to determining whether the wheels 114 are in need of replacement or maintenance, according to examples of the present disclosure. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the processes, or alternative processes, and not all of the blocks need be executed. For discussion purposes, the processes are described with reference to the environments, devices, architectures, diagrams, and systems described in the examples herein, such as, for example those described with respect to FIGS. 1-9, although the processes may be implemented in a wide variety of other environments, architectures, and systems.

FIG. 10 illustrates an example process 1000 associated with determining whether the wheels 114 need to be replaced or maintained. At 1002, the process 1000 may include receiving, from a sensor, sensor data. For example, the sensor(s) 132, such as a laser proximity sensor, may generate the sensor data 134. As will be explained herein, the sensor data 134 may be used to detect, or determine, a presence of the carrier 102 and/or the wheel 114 being adjacent, or in proximity to, the sensor 132. In some instances, the sensor 132 may continuously generate the sensor data 134 while the cross-belt sorter 104 is operating.

At 1004, the process 1000 may include determining whether a presence of a carrier is detected. For example, the process 1000 may analyze the sensor data 134 to determine whether the carrier 102, or components thereof, such as the flanges 402, the wheels 114, etc. are detected. In some instances, the sensor 132 may determine whether objects are in proximity to the sensor 132, and if so, may associate such object detection with the carrier 102 and/or the wheels 114. If at 1004 the process 1000 determines that the presence of the carrier 102 is not detected, the process 1000 may follow the "NO" route and loop to 1002. Here, the process 1000 may continue to receive the sensor data 134 for determining the presence of the carrier 102. Alternatively, if at 1004 the process determines that the presence of the carrier 102 is detected, the process 1000 may follow the "YES" route and proceed to 1006.

At 1006, the process 1000 may include determining a focusing position associated with an imaging device capturing an image of a wheel of the carrier. For example, based at least in part on the sensor data 134, the process 1000 may determine a distance disposed between the imaging device 122 and the wheel 114. The distance may be used to determine a focusing position associated with capturing an image of the wheel 114 such that the image of the wheel 114 is in focus. In some instances, the focusing position may be associated with a focal length of the imaging device 122, a position of the lens 602, etc. In some instances, the focusing position may be used to move, or otherwise adjust, the imaging device 122 and/or the lens 602. By capturing an image that is in focus, or that the wheel 114 is in focus, the image may be analyzed to determine the diameter of the wheel 114, as discussed herein.

At 1008, the process 1000 may include causing the imaging device and/or a lens to adjust to the focusing position. For example, the imaging device 122 may be moved (e.g., along the optical axis) to adjust a focal length of the imaging device 122. Additionally or alternatively, the lens 602 may be moved (e.g., along the optical axis) to adjust the focal length and/or a zoom of the imaging device 122.

At 1010, the process 1000 may include causing a lighting element to emit light. For example, based on detecting the presence of the carrier 102, the lighting element 126 may be instructed to emit light. In some instances, the lighting element 126 is associated with the imaging device 122, for example, a ring-lighting element disposed around the imaging device 122. Being as the carrier 102 was detected, the lighting element 126 may emit light such that the light may illuminate a FoV of the imaging device 122 for capturing the image. In some instances, the light emitted by the lighting element may be IR light.

At 1012, the process 1000 may include causing the imaging device to capture the image of the wheel. For example, based on detecting the presence of the carrier 102, the imaging device 122 may be instructed to capture the image of the wheel 114. In this sense, the presence of the carrier 102 is used as a trigger to capture the image of the wheel 114, thereby avoiding the imaging device 122 capturing unnecessarily amounts of images and/or continuously being powered. In some instances, the imaging device 122 may capture a single image of the wheel 114 or multiple successive images of the wheel 114. The imaging device 122 may be configured to capture the IR light emitted by the lighting element 126 and as reflected off the wheel 114. The filter 604, for example, may filter other wavelengths of light such that the imaging device 122 may receive the IR light.

In some instances, the image of the wheel 114 may additionally include the identifier 138 for identifying the wheel 114. In some instances, a separate image of the wheel 114, or the carrier 102, may be taken to image the identifier 138. However, in some instances, the wheel 114 may be identified via previous images of the other wheels 114 and knowing the position of the current wheel 114 being imaged relative to the previous wheels 114, and the identifier(s) 138 thereof.

At 1014, the process 1000 may include determining a dimension of the wheel. For example, the image may be analyzed to determine the dimension of the wheel 114, such as a diameter of the wheel 114. As noted above, in some instances, a single image or multiple images may be analyzed to determine the diameter (or an average diameter). In some instances, ML model(s) 136 may be used to determine the dimension. For example, the image(s) may be provided as an input into the ML model(s) 136, and the ML model(s) 136 may be trained to identify the wheel 114 and determine the dimension for the image(s).

At 1016, the process 1000 may include determining whether the dimension is less than a threshold. For example, the dimension may be compared against a threshold to determine whether the wheel 114 is worn. In some instances, the threshold may be a predetermined threshold associated with the wheels 114 (e.g., 98 mm). If the dimension is less than the threshold, the process 1000 may follow the "YES" route and proceed to 1018.

At 1018, the process 1000 may include generating a notification associated with replacing or maintaining the wheel. For example, because the dimension is less than the threshold, the wheel 114 may be scheduled to be replaced. In such instances, the notification(s) 140 may be generated and stored in association with the carrier 102. The notification(s) 140 may be used to schedule replacement of the wheel.

Alternatively, returning to 1016, if the process 1000 determines that the dimension is not less than the threshold, the process 1000 may follow the "NO" route and proceed to 1020. At 1020, the process 1000 may include refraining from generating the notification associated with replacing or maintaining the wheel. In some instances, the ML model(s) 136 may predict when the wheels 114 are in need of replacement based on the images. For example, even though the notification(s) 140 may not be generated, the ML model(s) 136 may learn to predict, at a future instance in time, when the wheel 114 will need replacement.

Although the process 1000 is described with regarding to a single imaging device imaging a single wheel, the process 1000 may similarly apply to other imaging devices and other wheels. For example, each of the imaging devices 122 may image a respective wheel for determining whether the wheel 114 has a dimension that is less than the threshold. In some instances, the determinations of whether the wheels 114 include the dimension less than the threshold may occur sequentially or in parallel. Moreover, in some instances, the imaging devices 122 may be configured to capture the images according to certain schedules (e.g., hourly, daily, etc.). For example, it may be repetitive to capture images of the wheels 114 every time the wheels 114 pass the imaging devices 122, respectively.

FIG. 11 illustrates an example process 1100 associated with determining characteristic(s) 130 of the carrier 102 and whether the carrier 102 contains any defect(s), according to examples of the present disclosure.

At 1102, the process 1100 may include receiving, from one or more sensor(s), sensor data associated with a carrier. For example, the sensor(s) 132 may generate sensor data 134 associated with the carrier 102, or components thereof, such as the wheels 114. In some instances, the sensor(s) 132 may include thermal imaging sensor(s) that generate sensor data 134 associated with a heat of bearings of the wheels, microphones that generate sensor data 134 associated with sound generated by the bearings of the wheels 114, etc. Any number of the sensor(s) 132 may generate the sensor data 134, and/or the sensor data 134 may be associated with any of the wheels 114. For example, sensor data 134 may be generated for each of the wheels 114.

At 1104, the process 1100 may include receiving, from one or more imaging device(s), image data associated with the carrier. For example, the imaging devices(s) 122 may generate image data 124 associated with the carrier 102, or components thereof, such as the wheels 114. Any number of the imaging devices(s) 122 may generate the image data 124, and/or the image data 124 may be associated with any of the wheels 114. For example, image data 124 may be generated for each of the wheels 114.

At 1106, the process 1100 may include determining, based at least in part on the sensor data and/or the image data, characteristic(s) of the carrier. For example, the sensor data 134 and/or the image data 124 may be analyzed to determine the characteristic(s) 130. In some instances, the characteristic(s) 130 may include a dimension of the wheels 114 (e.g., diameter), whether any chips, cracks, tears, etc. are present in the wheels 114, heat associated with bearings of the wheels 114, sound associated with bearings of the wheels 114, an alignment of the wheels 114, and so forth. In some instances, the sensor data 134 and/or the image data 124 may be provided as an input into one or more ML model(s) 136 to determine the characteristic(s) 130.

At 1108, the process 1100 may include determining whether the carrier includes any defect(s). For example, based on the characteristic(s) 130, the characteristic(s) 130 may be compared to thresholds, reference characteristic(s), etc. for determining whether any defect(s) are present. As an example, if a temperature of the bearings of the wheels 114 is too hot, the bearing may be defective and in need of replacement or maintenance (e.g., grease). In some instances, the ML model(s) 136 may be trained to determine and/or analyze the characteristic(s) 130 to determine whether any of the defect(s) are present. In some instances, the thresholds and/or reference(s) to which the characteristic(s) 130 are compared may be dynamic and/or updated based on the carrier 102, wheels 114, cross-belt sorter 104, etc.

If at 1108 the process 1100 determines that the defect(s) are not present, the process 1100 may follow the "NO" route and proceed to 1102. Alternatively, if the process 1100 determines that the defect(s) are present, the process 1100 may follow the "YES" route and proceed to 1110.

At 1110, the process 1100 may include determining an identifier associated with the carrier. For example, the sensor data 134 and/or the image data 124 may be analyzed to determine the identifier 138. In some instances, the identifier 138 may be determined via the sensor data 134 and/or the image data 124 captured of previous carriers 102, and through a known association (e.g., position) of the carriers 102 relative to one another.

At 1112, the process 1100 may include associating the defect(s) with the carrier. For example, the defect(s) may be associated with the carrier 102 by associating the defect(s)

with the identifier 138. Associating the defect(s) with the carriers permits the defect(s) to be tracked, and the carrier 102 to be scheduled for repair.

At 1114, the process 1100 may include generating a notification associated with the carrier. For example, the notification(s) 140 may be generated and stored in association with the carrier 102, such as via the identifier(s) 138. In some instances, the notification(s) 140 serve to schedule the carrier 102 for replacement or maintenance.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a carrier that traverses along a cross-belt sorter comprising a first track and a second track, the carrier including at least a first wheel, a second wheel, a third wheel, and a fourth wheel, wherein the first wheel and the second wheel engage with different surfaces of the first track, and wherein the third wheel and the fourth wheel engage with different surfaces of the second track;

a first imaging device arranged to image the first wheel;

a second imaging device arranged to image the second wheel;

a third imaging device arranged to image the third wheel;

a fourth imaging device arranged to image the fourth wheel;

a sensor;

one or more processors; and one or more non-transitory computer-readable media storing instructions that, when executed, cause the one or more processors to perform acts comprising:

receiving, from the sensor, sensor data;

determining, based on the sensor data, a presence of the carrier;

receiving, from the first imaging device and based on the presence of the carrier, first image data visually depicting the first wheel;

receiving, from the second imaging device and based on the presence of the carrier, second image data visually depicting the second wheel;

receiving, from the third imaging device and based on the presence of the carrier, third image data visually depicting the third wheel;

receiving, from the fourth imaging device and based on the presence of the carrier, fourth image data visually depicting the fourth wheel;

determining, based on the first image data, a first diameter of the first wheel;

determining, based on the second image data, a second diameter of the second wheel;

determining, based on the third image data, a third diameter of the third wheel;

determining, based on the fourth image data, a fourth diameter of the fourth wheel;

determining that at least one of the first diameter, the second diameter, the third diameter, or the fourth diameter is less than a threshold diameter; and generating, based on at least one of the first diameter, the second diameter, the third diameter, or the fourth diameter being less than the threshold diameter, a notification associated with replacing at least one of the first wheel, the second wheel, the third wheel, or the fourth wheel.

2. The system of claim 1, further comprising:

a first lighting element at least partially disposed around the first imaging device, the first lighting element being configured to illuminate the first wheel;

a second lighting element at least partially disposed around the second imaging device, the second lighting element being configured to illuminate the second wheel;

a third lighting element at least partially disposed around the third imaging device, the third lighting element being configured to illuminate the third wheel; and a fourth lighting element at least partially disposed around the fourth imaging device, the fourth lighting element being configured to illuminate the fourth wheel.

3. The system of claim 1, the acts further comprising:

determining a first focusing position of the first imaging device or a first lens associated with the first imaging device generating the first image data of the first wheel;

determining a second focusing position of the second imaging device or a second lens associated with the second imaging device generating the second image data of the second wheel;

determining a third focusing position of the third imaging device or a third lens associated with the third imaging device generating the third image data of the third wheel; and determining a fourth focusing position of the fourth imaging device or a fourth lens associated with the fourth imaging device generating the fourth image data of the fourth wheel.

4. The system of claim 1, wherein:

determining the first diameter is based on:

providing, as a first input into a machine-learned (ML) model, the first image data, and receiving, as a first output from the ML model, the first diameter;

determining the second diameter is based on:

providing, as a second input into the ML model, the second image data, and receiving, as a second output from the ML model, the second diameter;

determining the third diameter is based on:

providing, as a third input into the ML model, the third image data, and receiving, as a third output from the ML model, the third diameter; and determining the fourth diameter is based on:

providing, as a fourth input into the ML model, the fourth image data, and receiving, as a fourth output from the ML model, the fourth diameter.

5. A method comprising:

receiving, from one or more sensors, sensor data;

determining a presence of a carrier disposed along a conveyor-based system;

causing, based at least in part on the presence of the carrier, a lighting element to illuminate a first wheel of the carrier;

causing, based at least in part on the presence of the carrier and while the lighting element illuminates the first wheel, an imaging device to capture image data associated with the wheel;

determining, based at least in part on the image data and the sensor data, one or more characteristics associated with the first wheel, the one or more characteristics comprising at least one of: a size of the first wheel, a shape of the first wheel, one or more cracks in the first wheel, or one or more tears in the first wheel;

determining a defect of the first wheel based least in part on the one or more characteristics;

causing, based at least in part on the presence of the carrier, a second lighting element to illuminate a second wheel of the carrier that has a second orientation that is different than a first orientation of the first wheel;

causing, based at least in part on the presence of the carrier and while the second lighting element illuminates the second wheel, a second imaging device to capture second image data associated with the second wheel; and determining, based at least in part on the second image data, one or more second characteristics associated with the second wheel.

6. The method of claim 5, wherein:

the lighting element is configured to emit infrared (IR) light; and the imaging device is configured to capture the IR light reflected off the first wheel.

7. The method of claim 5, further comprising:

determining, based at least in part on the sensor data, the presence of the carrier adjacent to the imaging device.

8. The method of claim 5, further comprising:

determining a focusing position of the imaging device or a lens associated with the imaging device for capturing the image data.

9. The method of claim 5, further comprising:

providing, as an input into a machine-learned (ML) model, the image data; and receiving, as an output from the ML model, the one or more characteristics.

10. A system comprising:

one or more processors; and one or more non-transitory computer-readable media storing instructions that, when executed, cause the one or more processors to perform acts comprising:

receiving, from one or more sensors, sensor data;

determining, based at least in part on the sensor data, a presence of a carrier;

receiving, from an imaging device, image data associated with the carrier;

determining, based at least in part on the image data, one or more characteristics associated with a wheel of the carrier, the one or more characteristics comprising at least one of: a size of the wheel, a shape of the wheel, one or more cracks in the wheel, or one or more tears in the wheel;

determining that the wheel is to be replaced or repaired;

causing, based at least in part on the presence of the carrier, a lighting element to illuminate a second wheel of the carrier that has a second orientation that is different than a first orientation of the wheel;

causing, based at least in part on the presence of the carrier and while the second lighting element illuminates the second wheel, a second imaging device to capture second image data associated with the second wheel; and determining, based at least in part on the second image data, one or more second characteristics associated with the second wheel.

11. The system of claim 10, the acts further comprising:

causing, based at least in part on the presence of the carrier, the imaging device to generate the image data.

12. The system of claim 10, the acts further comprising causing, based at least in part on the presence of the carrier, the lighting element to illuminate a field of view of the imaging device.

13. The system of claim 10, the acts further comprising:

providing, as an input into a machine-learned (ML) model, the image data; and receiving, as an output from the ML model, the one or more characteristics.

14. The system of claim 10, further comprising:

determining, based at least in part on the second image data, one or more second characteristics associated with the second wheel.

15. The system of claim 14, wherein:

the imaging device and the second imaging device are located along a cross-belt sorter on which the carrier traverses;

the wheel engages with a first track of the cross-belt sorter; and the second wheel engages with a second track of the cross-belt sorter.

* * * * *